US009611102B2

(12) United States Patent
Job et al.

(10) Patent No.: US 9,611,102 B2
(45) Date of Patent: Apr. 4, 2017

(54) LANING ROBOT SYSTEMS AND METHODS

(71) Applicant: Illinois Tool Works Inc., Glenview, IL (US)

(72) Inventors: Matthew A. Job, Greenville, SC (US); Christopher A. Ray, Greer, SC (US); Roger T. Johnston, Spartanburg, SC (US); Gregory Bruns, Moore, SC (US); Bernard McPheely, Greer, SC (US)

(73) Assignee: Illinois Tool Works Inc., Glenview, IL (US)

(*) Notice: Subject to any disclaimer, the term of this patent is extended or adjusted under 35 U.S.C. 154(b) by 86 days.

(21) Appl. No.: 14/015,348

(22) Filed: Aug. 30, 2013

(65) Prior Publication Data

US 2014/0119875 A1 May 1, 2014

Related U.S. Application Data

(60) Provisional application No. 61/718,750, filed on Oct. 26, 2012.

(51) Int. Cl.
| | |
|---|---|
| *B25J 15/06* | (2006.01) |
| *B65G 47/71* | (2006.01) |
| *B65G 47/91* | (2006.01) |
| *B65G 61/00* | (2006.01) |

(52) U.S. Cl.
CPC .......... *B65G 47/71* (2013.01); *B25J 15/0616* (2013.01); *B65G 47/918* (2013.01); *B65G 61/00* (2013.01)

(58) Field of Classification Search
CPC . B25J 15/0616; B25J 11/0045; B65G 47/918; B65G 47/912; B65G 47/914
USPC ........................ 414/752.1; 198/468.4; 901/40
See application file for complete search history.

(56) References Cited

U.S. PATENT DOCUMENTS

| | | | | |
|---|---|---|---|---|
| 6,283,694 | B1* | 9/2001 | Spatafora et al. | 414/627 |
| 8,590,954 | B2* | 11/2013 | Hummeler et al. | 414/749.5 |
| 2005/0224186 | A1* | 10/2005 | Sillner | H01L 21/67132 414/416.01 |
| 2013/0038077 | A1* | 2/2013 | Hummeler et al. | 294/183 |
| 2014/0023461 | A1* | 1/2014 | Schaller et al. | 414/751.1 |
| 2014/0377049 | A1* | 12/2014 | Girtman | 414/800 |

* cited by examiner

*Primary Examiner* — Gerald McClain
(74) *Attorney, Agent, or Firm* — JK Intellectual Property Law, PA

(57) ABSTRACT

A system creates streams of articles on a laning conveyor having differentiated lanes from groups of articles on a feed, the groups each including articles arranged in a grid including at least two rows. The system includes an end effector on a robot arm. The robot arm is configured to simultaneously lift all of the articles in all of the rows of one of the groups from the feed. The end effector has individually actuatable row portions corresponding to the locations of the articles in the groups. The end effector is configured to sequentially place the lifted articles of each of the rows on the laning conveyor in a given lane of the laning conveyor. Related end effectors and methods are disclosed.

30 Claims, 23 Drawing Sheets

LANING ROBOT SYSTEMS AND METHODS

This application claims filing benefit of U.S. Provisional Patent Application Ser. No. 61/718,750 having a filing date of Oct. 26, 2012, which is incorporated herein by reference in its entirety.

TECHNICAL FIELD

The present disclosure relates generally to organizing articles provided in groups having rows and columns into a series of differentiated lanes.

BACKGROUND

Articles such as beverages or other consumer product containers are typically filled in a production line where a single given liquid or other product is placed in the articles. The operation of the line may be changed if a different flavor or type of liquid is to be used. Liquid supply, container type, labeling, etc., may be changed in such case.

Typically, all of the filled articles leaving a production line during a given production run hold the same product. The filled articles are then grouped by machinery or hand into groupings to be used for wholesale or retail shipment. Packaging of some sort is used to hold the groupings together as desired. The packaging could be multipacks of various designs, shrink wrapping, stretch wrapping, trays, boxes, combinations, etc. Articles may be grouped from 2 to 24 or more in a grouping.

Because production lines typically output only a single type of article, they are not typically designed to create mixed groupings of articles. In the case of soda, one might wish to mix different flavors in a case of 24 cans. To do so, complicated singulating and laning systems have been employed to divide mass flows of each flavor of articles into single file rows of articles. If a mixed case of four flavors were desired, then four such systems would be required. Portions of the resulting differentiated flows are then grouped in the number desired in the mixed grouping (such as six articles of each of four flavors to create a case of 24 articles). Cartoning or other packaging machines can take a plurality of flows and divide them into groups for packaging, such as six of each of four flavors, using conveyors, flight bars, pins, etc. While such singulating and laning systems have been successfully deployed for many years, such systems require a fair amount of floor space, and include numerous motors, sensors, and controls to drive conveyor belts. If four systems are provided together, required size, complication and cost is increased.

To avoid such issues, groupings have often been done manually. In such systems, employees place bulk groupings of articles into differentiated lanes according to a desired grouping. However, multiple employees would likely be required to match the throughput of a given multi-beverage singulating and laning system, which may be impractical from a cost or space available aspect.

Accordingly, a system for creating differentiated, laned flows of articles for packaging in desired groupings and that addresses one or more of the above drawbacks of present systems, or that solves other problems, would be welcome.

SUMMARY

Aspects and advantages of the invention will be set forth in part in the following description, or may be obvious from the description, or may be learned through practice of the invention.

According to certain aspects of the present disclosure, a system creates streams of articles on a laning conveyor having differentiated lanes from groups of articles on a feed, the groups each including articles arranged in a grid including at least two rows. The system includes an end effector on a robot arm. The robot arm is configured to simultaneously lift all of the articles in all of the rows of one of the groups from the feed. The end effector has individually actuatable row portions corresponding to the locations of the articles in the groups. The end effector is configured and to sequentially place each row of the lifted articles onto the laning conveyor in a given lane of the laning conveyor. Various options and modifications are possible.

According to certain other aspects of the disclosure, an end effector is disclosed for a robot arm for lifting groups of articles on a feed and placing the articles in a given lane of a laning conveyor, the groups each including articles arranged in a grid including at least two rows. The end effector includes a body for attachment to the robot arm. The body has individually actuatable row portions corresponding to the locations of the articles in the rows of the groups. The end effector is configured to simultaneously lift all of the articles in all of the rows of one of the groups from the feed and to sequentially place each row of the lifted articles onto the laning conveyor in a given lane of the laning conveyor. Again, various options and modifications are possible.

According to certain other aspects of the disclosure, a method is disclosed of creating streams of articles on a laning conveyor having differentiated lanes from groups of articles on a feed, the groups each including articles arranged in a grid including at least two rows. The method includes the steps of providing the groups of articles on the feed; lifting all of the articles in one of the groups of articles from the feed simultaneously; and placing the lifted articles on a given lane in the laning conveyor by sequentially placing one row at a time. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
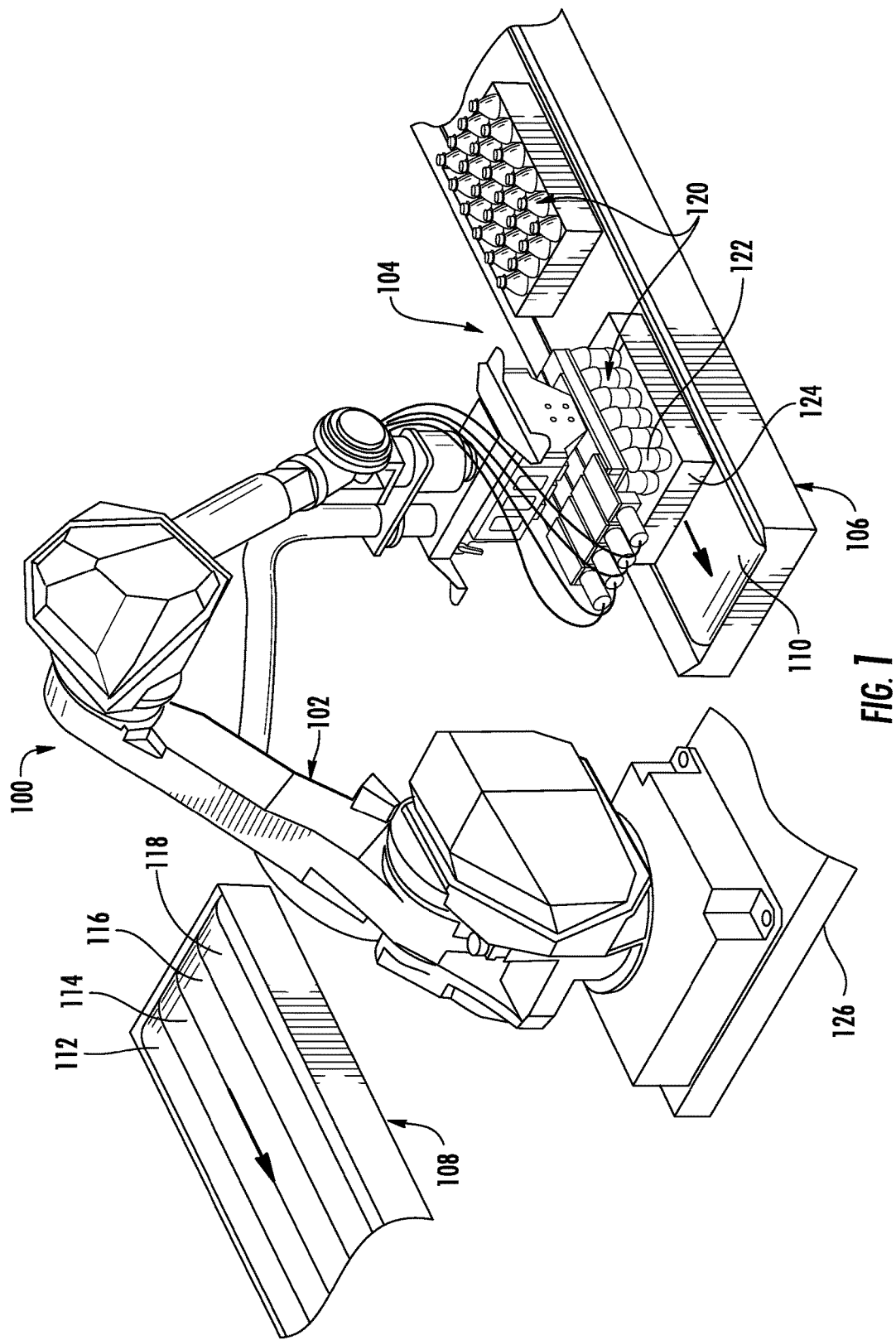
FIG. 1 is a perspective view of a system for creating streams of articles according to certain aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 through 6B show a first example of a system for creating streams of articles on a laning conveyor with differentiated lanes from groups of articles on a feed, according to certain aspects of the present disclosure. As shown, a system 100 may include one or more robot arm devices 102, each having an end effector assembly 104 for removing groups of articles from a feed 106 and placing them on a laning conveyor 108. Feed 106 may include a feed conveyor 110 and laning conveyor 108 may include individual conveyors 112, 114, 116 and 118. Groups 120 of articles 122 are fed along feed 106 to reach a position near robot arm assembly 102. Groups 120 may comprise any sort of group of articles such as containers for beverages, foods, liquids, etc. or any other articles that can be individually grouped as such. As shown in FIG. 1, each group includes 24 articles (bottles) 122 arranged in four rows of six articles each. Groups 120 may be fed with related packaging or support materials, such as a small box 124, or a tray blank, or any other support structure. However, no such support structure is required.

Robot arm assembly 102 may be mounted on support structure 126 that may be adjacent to either feed 106 or laning conveyor 108, or it may extend atop either, depending on the application as we discussed below.

Figure 2A:
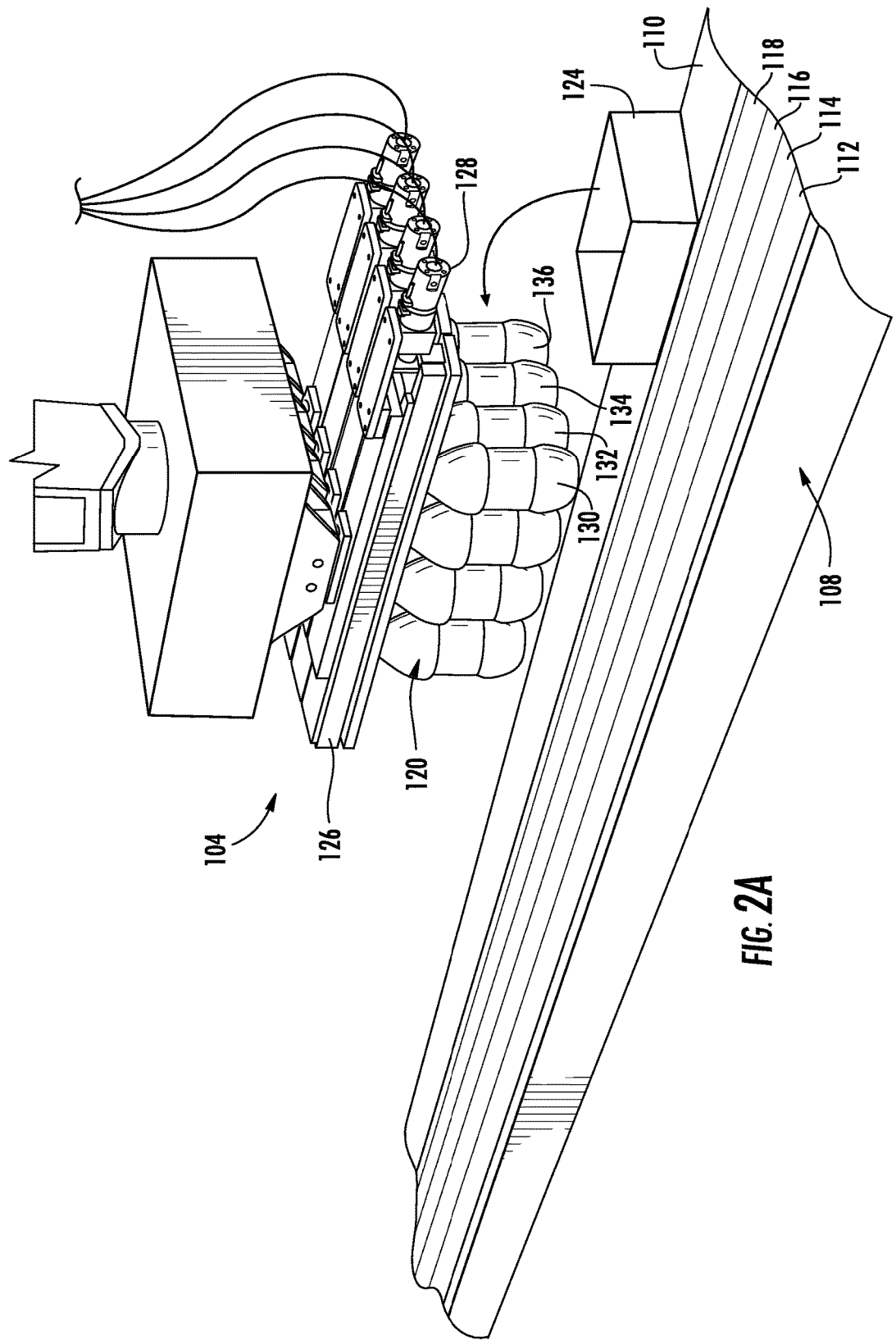
FIG. 2A is a partial perspective view of a robot arm assembly and end effector showing lifting of articles from a supply conveyor for placement on the laning conveyor.

As shown in FIG. 2A, end effector assembly 104 includes a number of individually actuatable row portions that include body sections 126 that correspond to the locations of articles 122 in group 120. In FIG. 2A, the rows of articles are noted as elements 130, 132, 134 and 136. Each of such rows can be independently and simultaneously lifted from feed conveyor 110 by end effector 104, as shown in FIG. 2A. Robot arm assembly 102 moves end effector assembly 104 from a position near feed conveyor 110 to a position near one or more of the lanes 112, 114, 116 and 118 of laning conveyor 108. Typically, all of the articles 122 supplied in a given group of rows as shown in FIG. 2A are identical, however this need not be the case in all aspects of the invention.

Figure 2B:
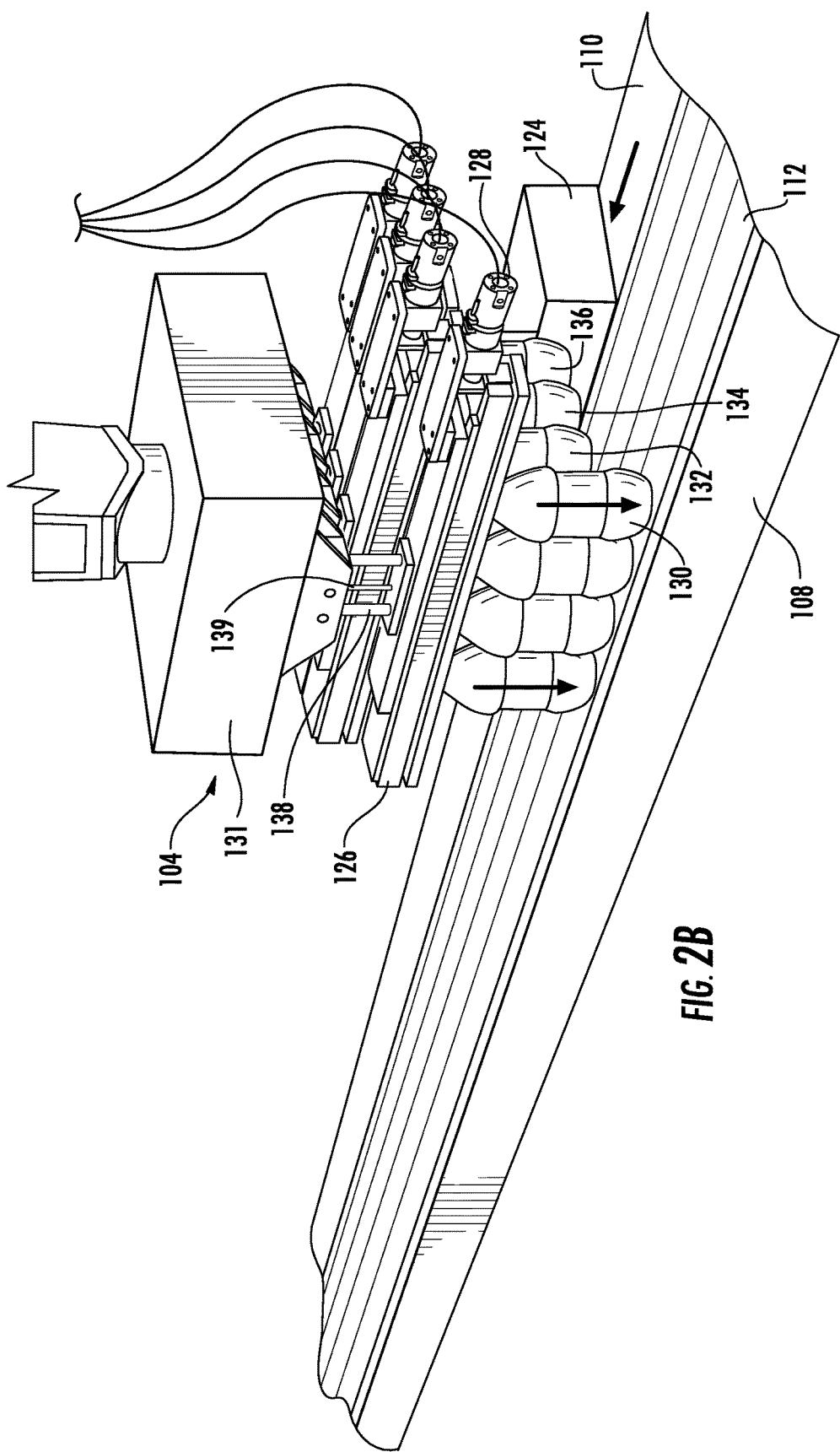
FIG. 2B is a partial perspective view showing a first group of articles being placed in a first lane.

FIG. 2B shows end effector assembly 104 depositing a first group 130 of articles on conveyor 112. Such deposit is done with continuous motion by syncing the position and speed of end effector 104 with the position and speed of individual lane 112 of laning conveyor 108. As the laning conveyor moves in a given speed in a flow direction, the robot arm end effector 104 is moved at a similar speed so as to smoothly place the groups of articles on one or more lanes of the laning conveyor. Each row portion 126 is moved downward, sliding relative to end effector assembly upper portion 131 by virtue of a pneumatic or hydraulic piston member 139. The actuator assembly (not shown) is held within head portion 131 of end effector assembly 104.

Figure 4:
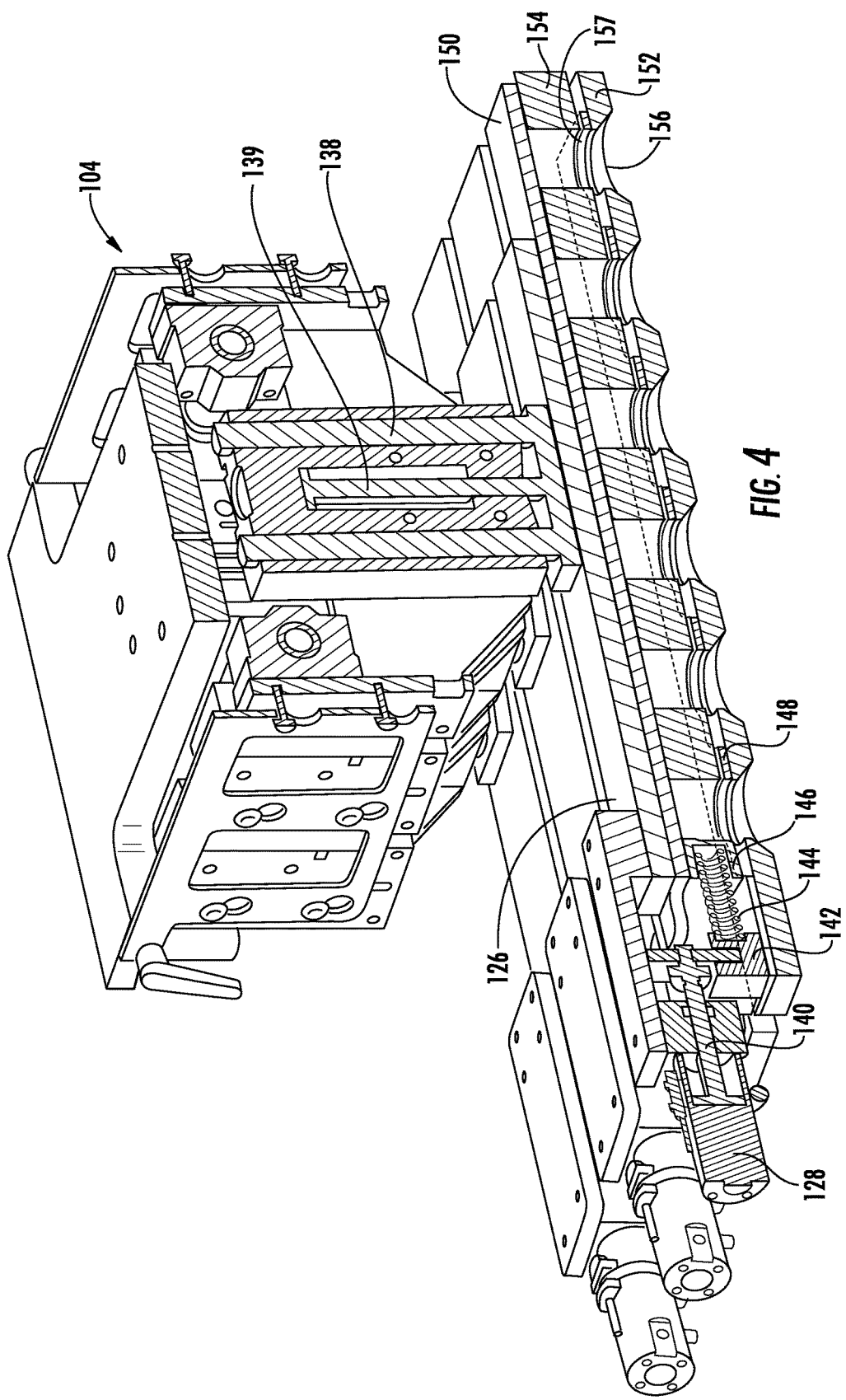
FIG. 4 is a cross-sectional view of the end effector assembly of FIG. 3.
Figure 5:
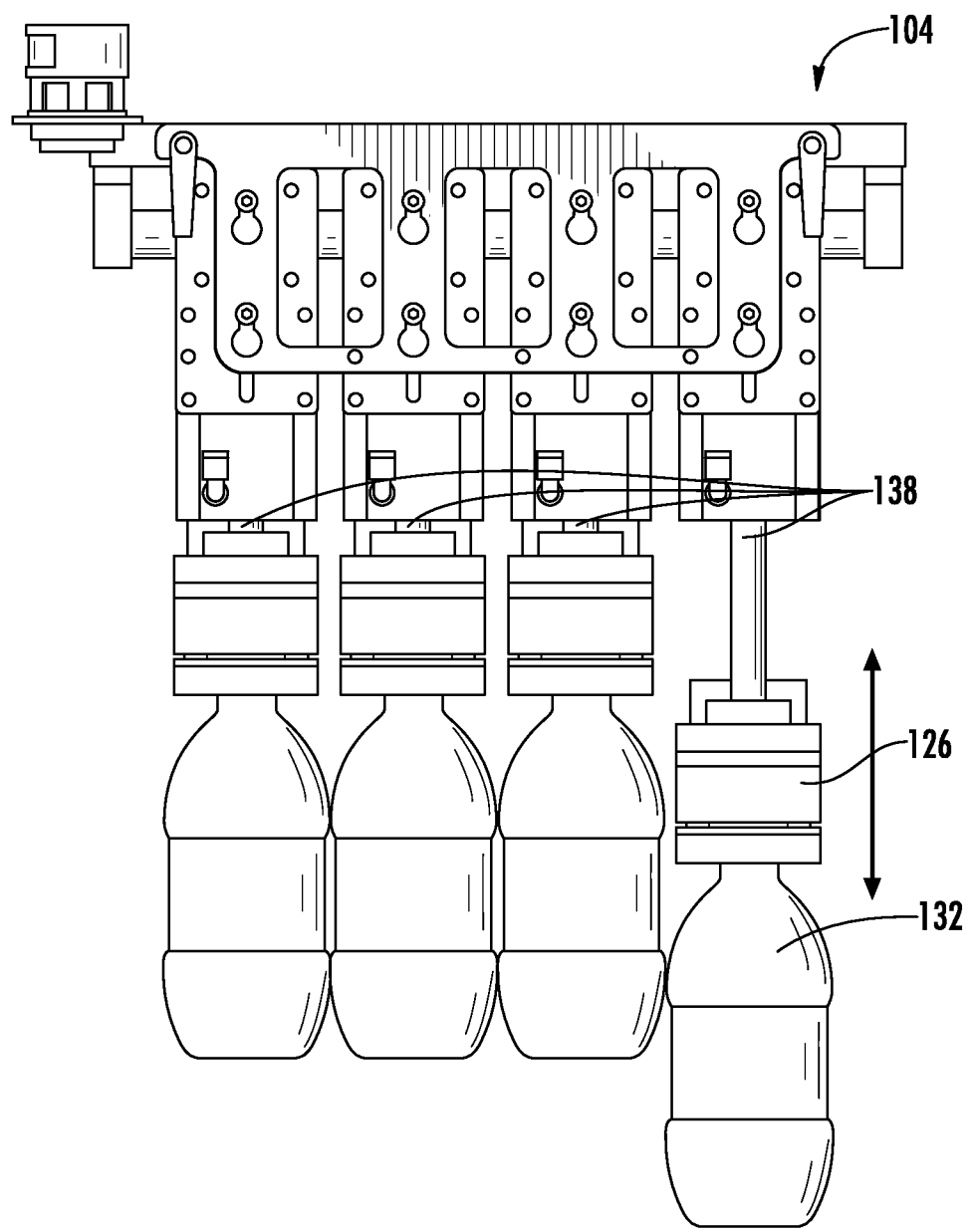
FIG. 5 is an end view of the end effector assembly of FIG. 3 showing one row of articles being lowered.
Figure 6A:
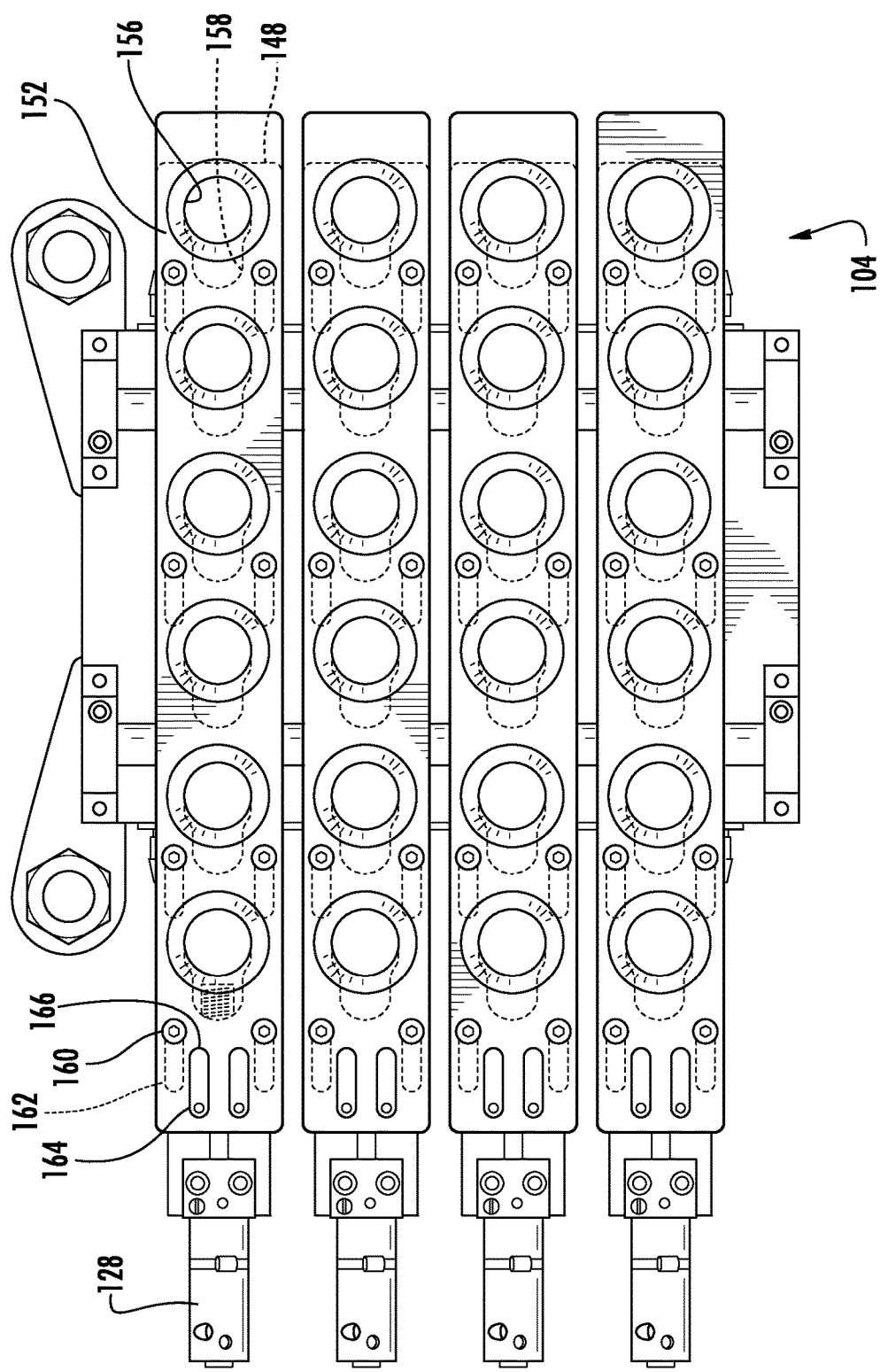
FIG. 6A is a bottom view of the end effector assembly of FIG. 1 in an opened position.
Figure 6B:
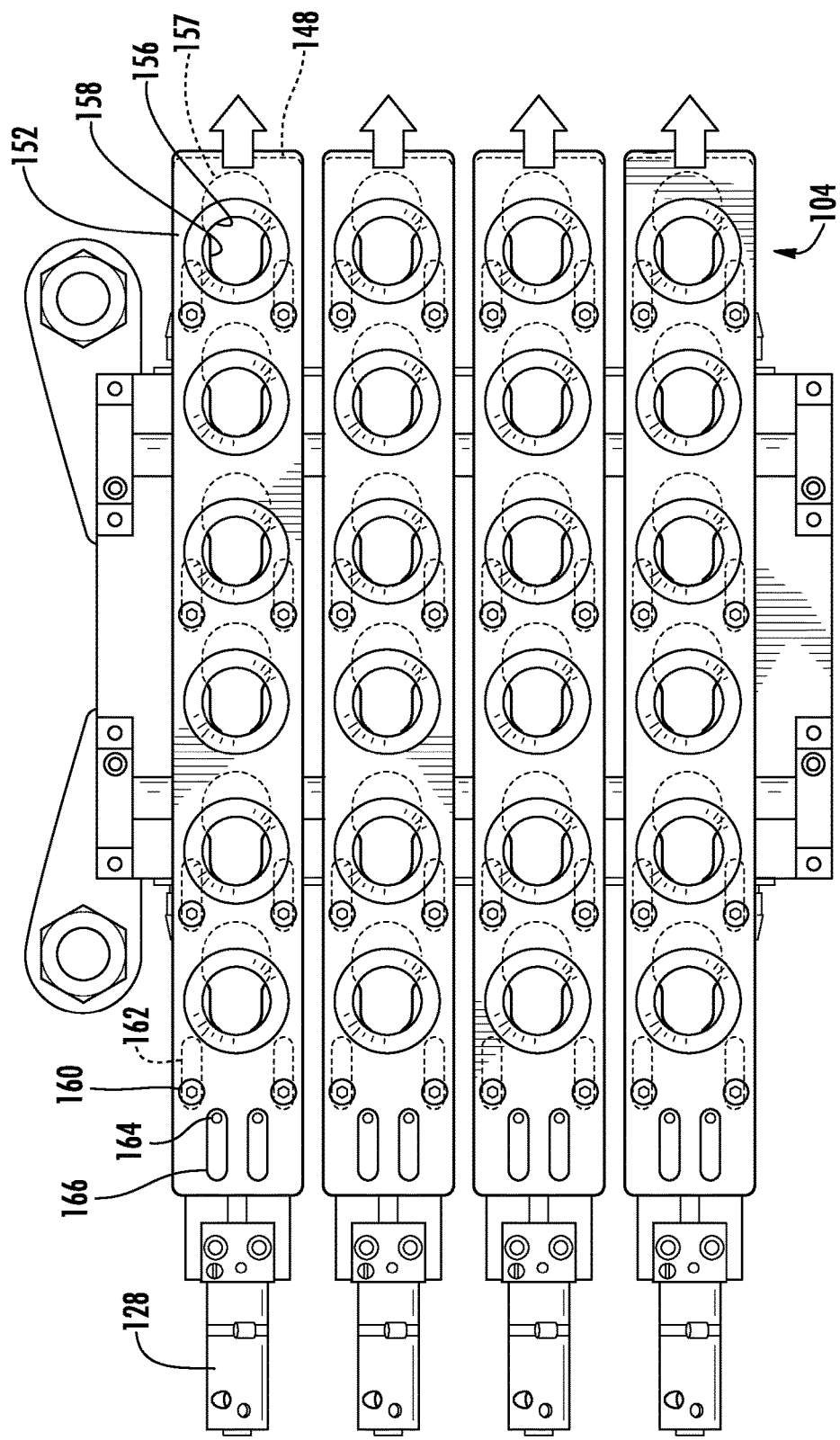
FIG. 6B is a bottom view as in FIG. 6A, in a gripping position.

Actuatable row portions 126 may be configured to mechanically grip articles within a given row. Accordingly, actuators 128 which may be a servo motor, or a pneumatic or hydraulic actuator as desired, can be employed to move parts within actuatable row portions to allow gripping and ungripping of the articles. FIG. 4 shows one example of such a mechanical gripping system. As shown therein, actuatable row portion 126 includes a top plate 150, a bottom plate 152, and a center portion 154 joined together. A gripping plate 148 is disposed slidably between plates 152 and portion 154. A spring 144 urges plate 148 into an open position (as shown in FIG. 6A). Operation of actuator 128 moves plate 128 toward a gripping position (as shown in FIG. 6B) via linked elements 140, 142, etc. so as to compress spring 144 against stop 146 of center portion 154.

FIG. 6A shows that when plate 148 is in the gripping position opening 156 of bottom plate 152 of actuatable row portion 126 is aligned with a substantially circular portion 157 of an opening through plate 148. Opening 156 may be flared outward in a downward direction to assist in guiding articles into actuatable row portions 126. Section 158 of the opening through plate 148 is not as wide as section 157. Therefore, when plate 148 is slid from the position of FIG. 6A to the position of FIG. 6B, section 158 slides into and blocks a portion of opening 156. Section 158 can therefore be used beneath a flange, ridge, cap, etc. of an article to grip and lift the article by maintaining plate 148 in the position shown in FIG. 6B. Sliders 160 and 164 in slots 162 and 166 can be used to guide plates 148 back and forth linearly as positioned by actuators 128.

It should be understood that various types of mechanical gripping systems could be used within the individually actuatable row portions 126. Therefore, alternatives to sliding plates and interfering hole sizes, as discussed above could be employed. A series of individually actuated grippers (one per article), or various other suitable devices for mechanically gripping individually articles in rows could be employed according to certain aspects of the invention.

Figure 2C:
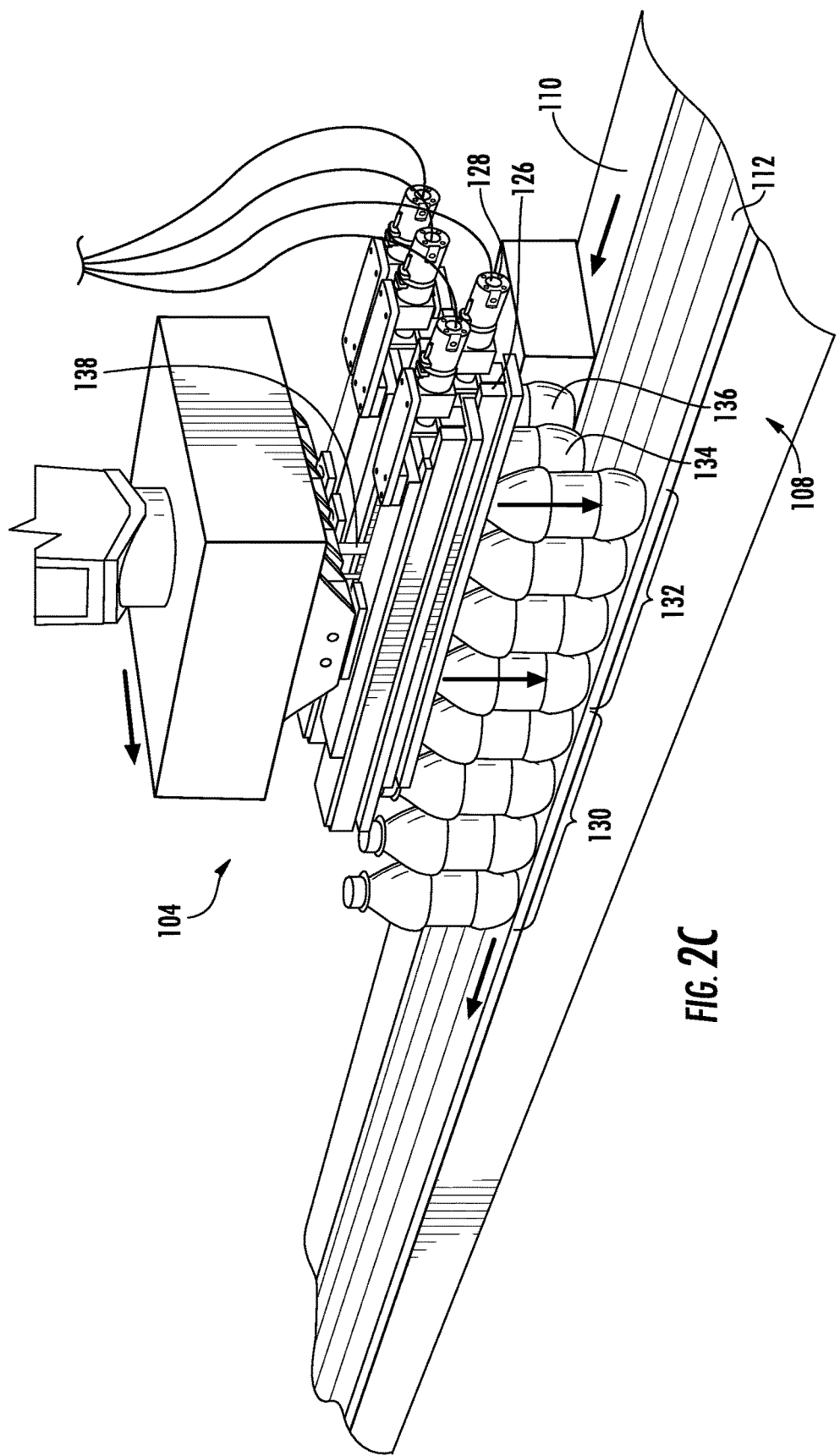
FIG. 2C is a partial perspective view showing a second group of articles being placed in the first lane.
Figure 2D:
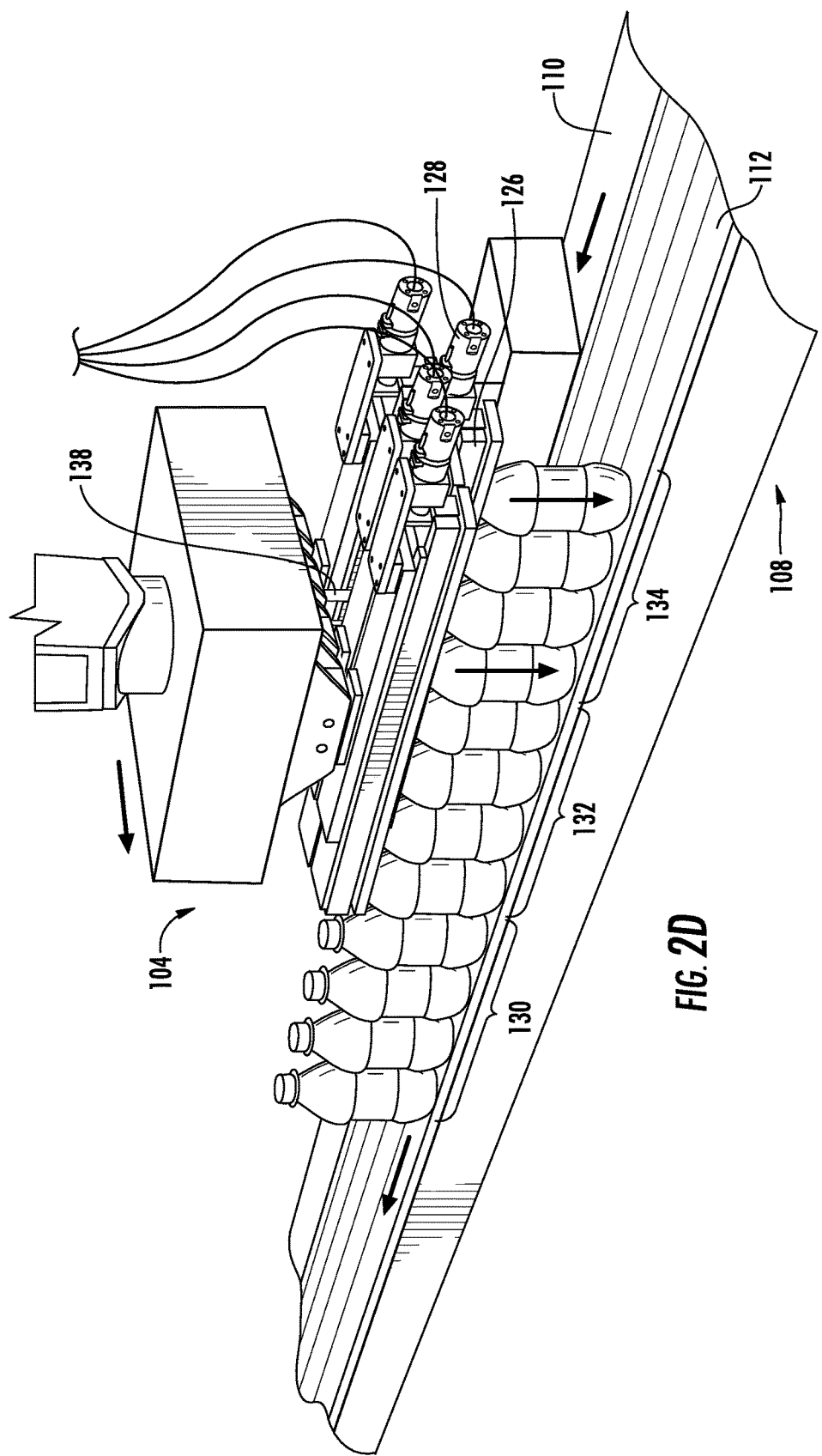
FIG. 2D is a partial perspective view showing a third group of articles being placed in the first lane.
Figure 2E:
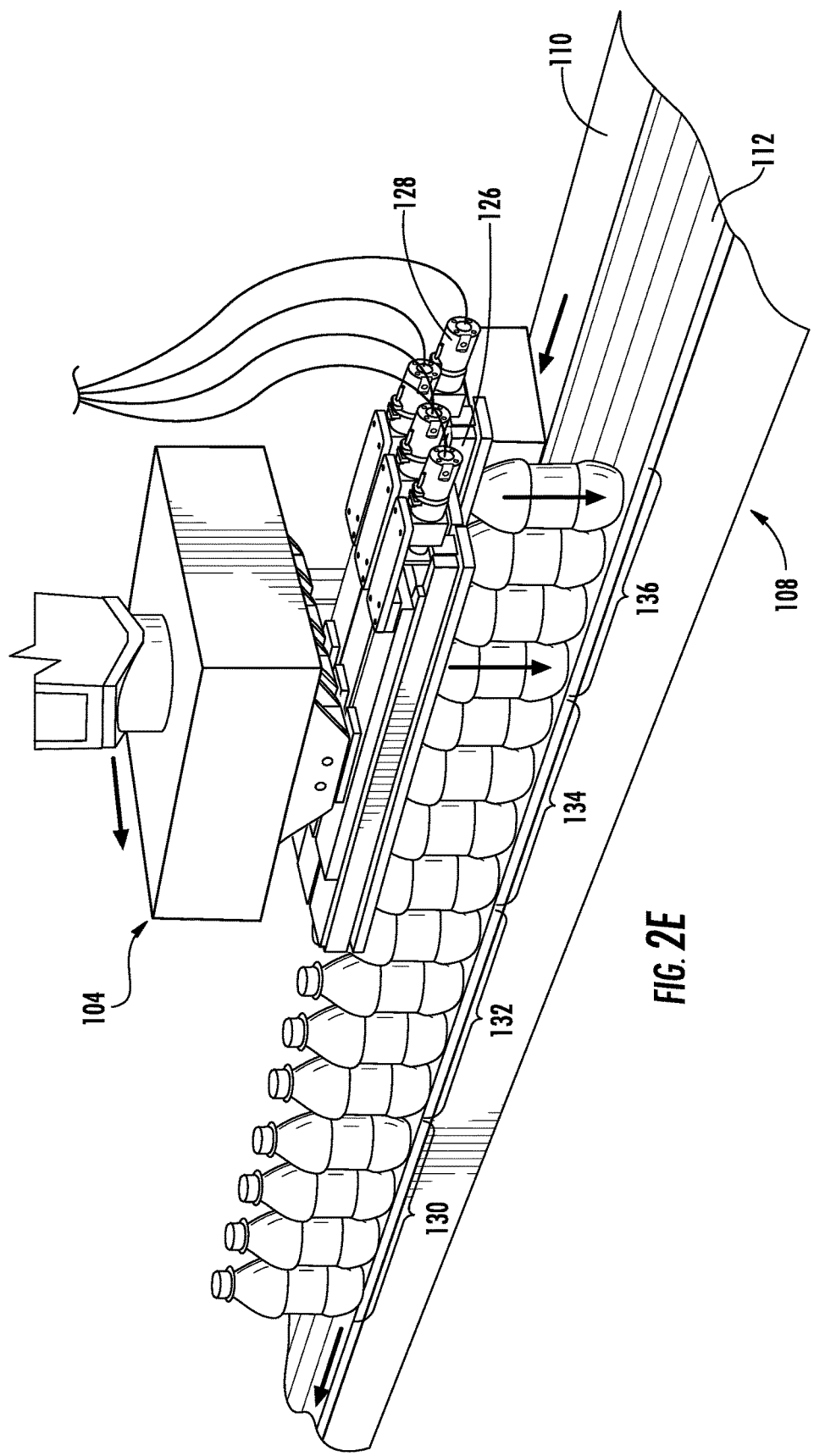
FIG. 2E is a partial perspective view showing a fourth group of articles being placed in the first lane.
Figure 3:
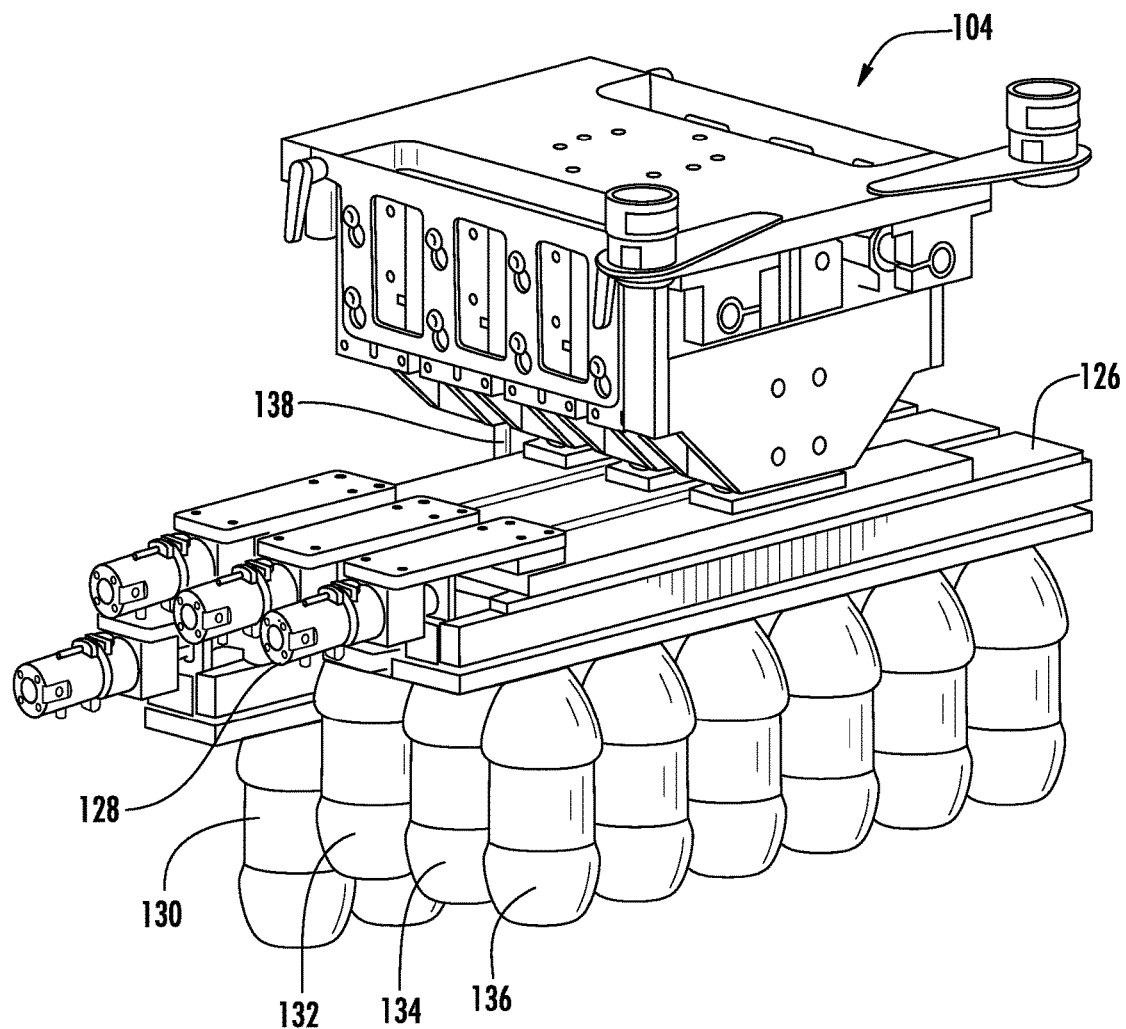
FIG. 3 shows a perspective view of a portion of an end effector assembly useful with a robot arm according to certain aspects of the disclosure.

Returning to the series of FIGS. 2A-2E, in FIG. 2B, a first group 130 of articles is being placed on laning conveyor 112. In FIG. 2C, a second group 132 of articles is placed using a second individually actuatable row portion 126. In FIG. 2D, a third group 134 is placed, and in FIG. 2E a fourth group 136 is placed. Thus, robot arm assembly 102 and end effector 104 can be moved vertically, horizontally, in a flow direction of conveyor 112 and perpendicular to the flow direction, as desired. In doing so, individual groups of articles may be sequentially placed adjacent each other on a given lane 112 of laning conveyor 108, thereby converting a 4×6 box of 24 articles into a 1×24 row of articles on land 112. Robot arm assembly 102 can repeat such process as desired and place articles on lanes 114, 116, and 118 sequentially in a given order or in the order in which items are supplied, if such is random. Articles can also optionally be placed in two or more lanes 112, 114, 116, and 118, adjacent or not, simultaneously by end effector 104, if supplied in a manner matching a desired location on the lanes. Such multiple placements, for example by lowering two row portions 126 simultaneously, can provide further efficiency. Use of such a robot arm assembly within system 100 therefore beneficially provides, in a small footprint, a rapid placement of articles in a laning conveyor with minimal use of manpower or supervision.

Figure 7:
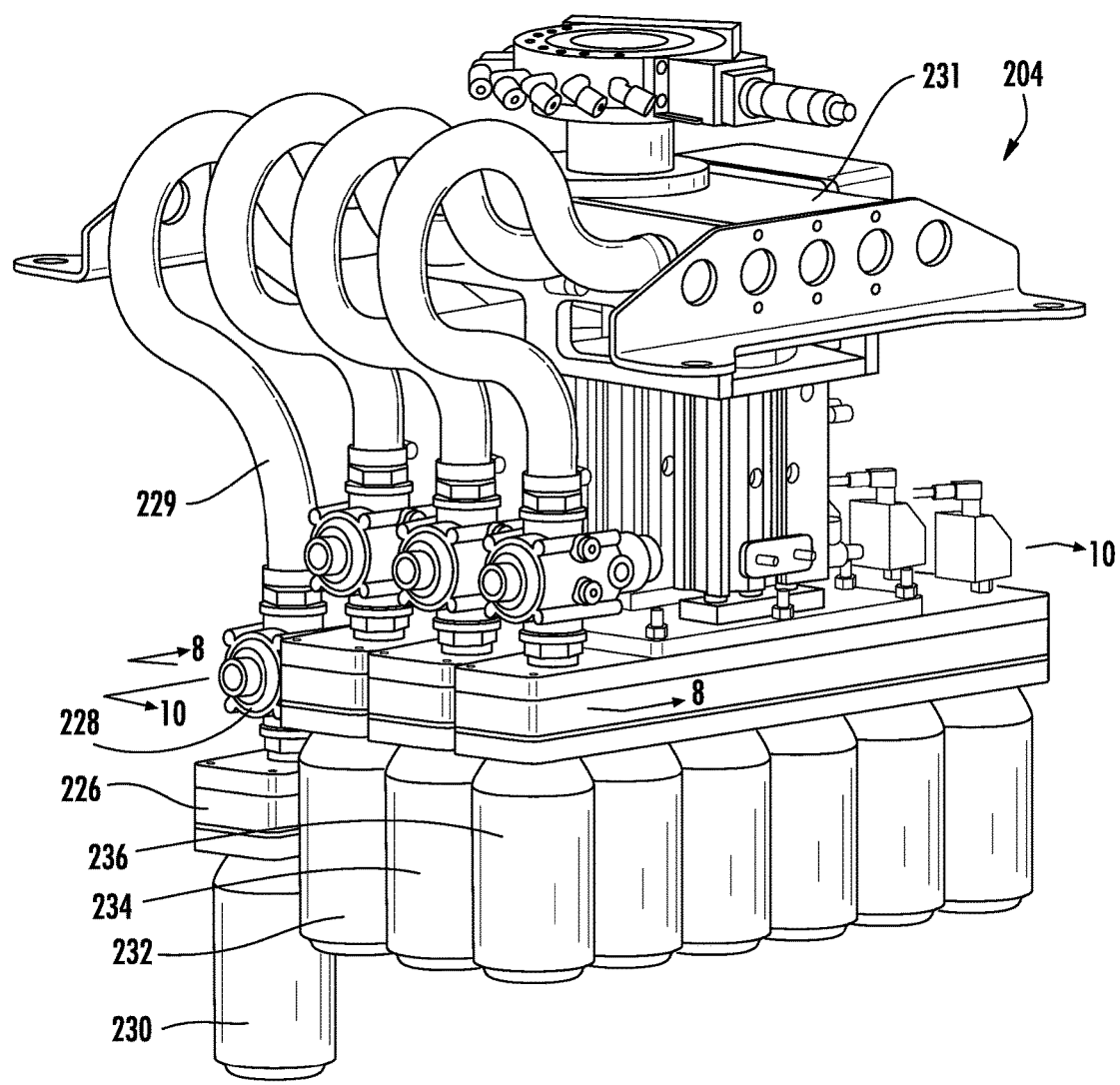
FIG. 7 is a perspective view of an alternate end effector assembly wherein vacuum instead of grippers is used to lift articles.
Figure 8:
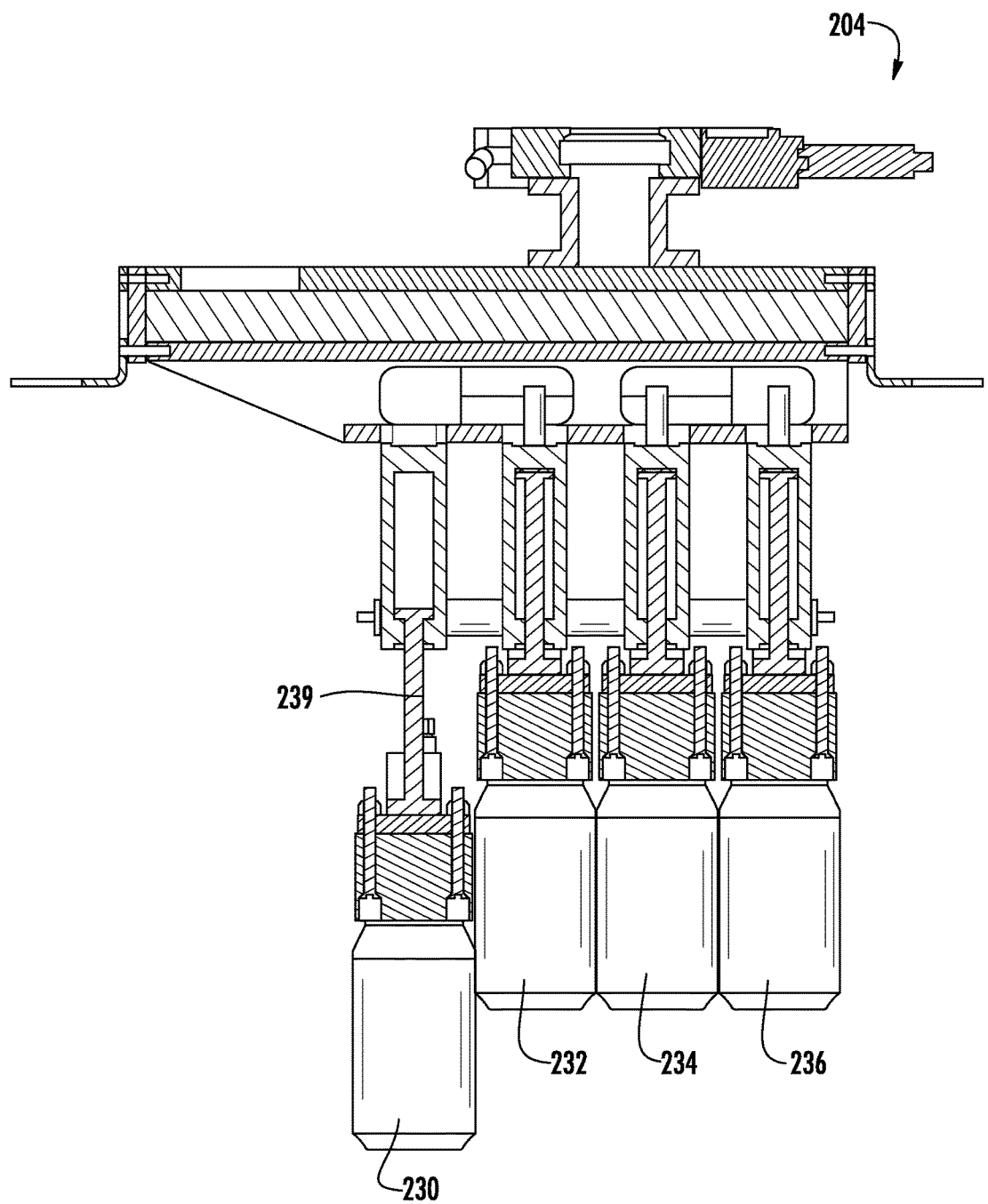
FIG. 8 is a cross-sectional view taken along line 8-8 in FIG. 7 showing one row of articles being placed.
Figure 9:
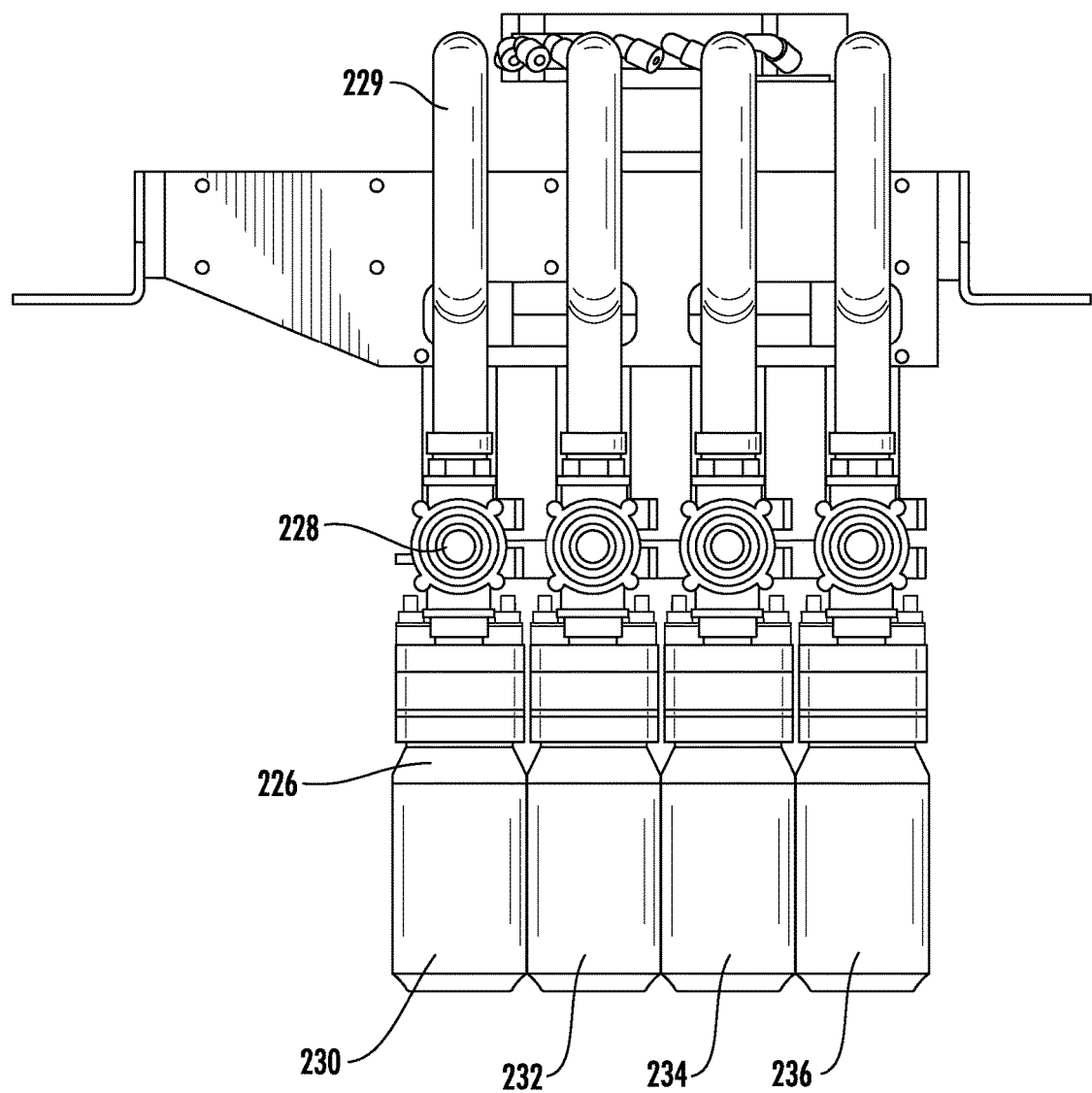
FIG. 9 is an end view of the end effector assembly of FIG. 7 showing all articles being lifted.
Figure 10:
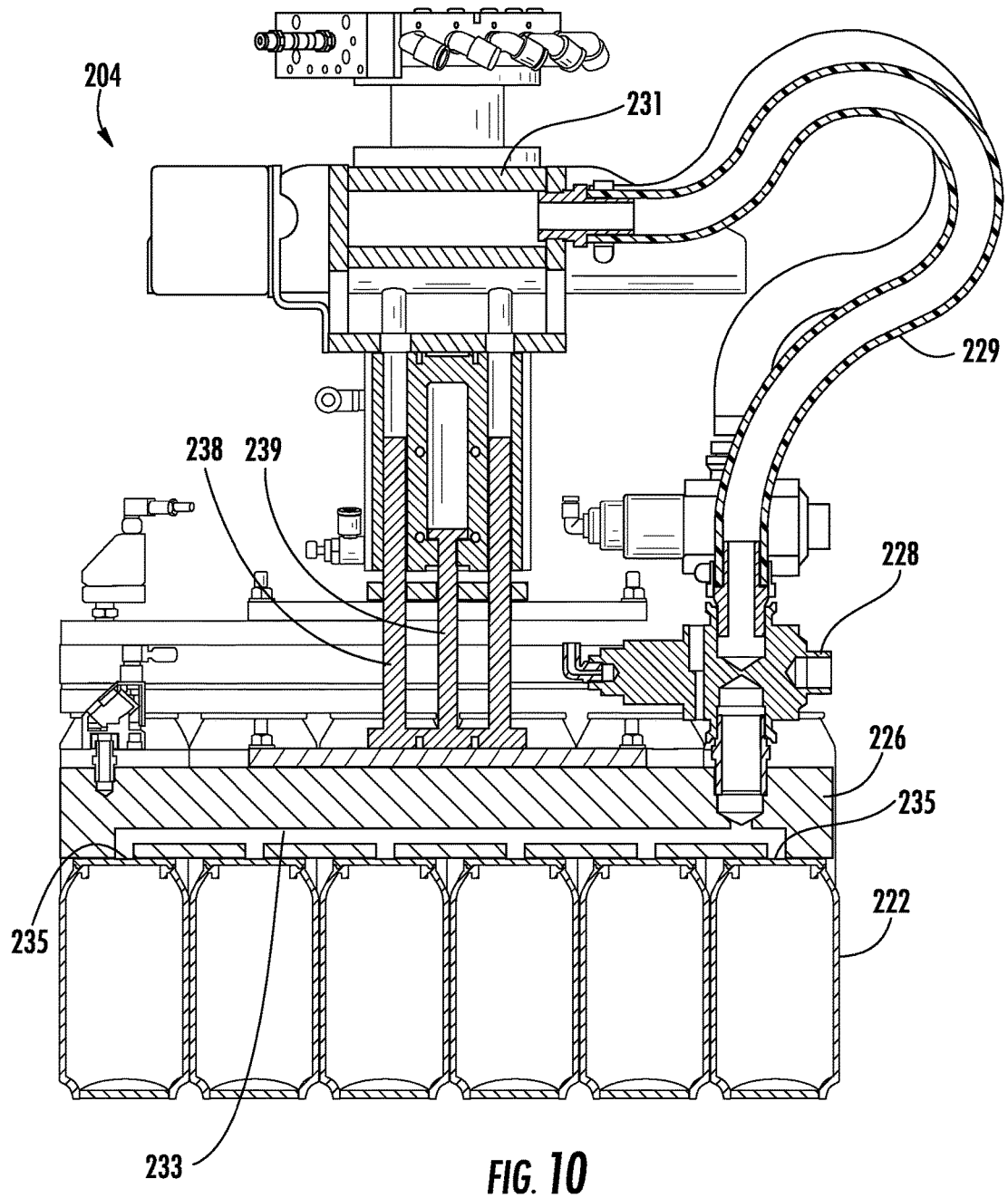
FIG. 10 is a cross-sectional view taken along line 10-10 in FIG. 7 showing a row of articles as lifted by vacuum.

FIGS. 7-10 show an alternate end effector 204 assembly that can be used with robot arm assembly 102 within system 100 above. As shown in these figures, end effector assembly 204 includes individually actuatable row portions 206 that are configured to grip the articles via vacuum. Such a gripping mechanism may be useful, for example, with cans or other articles having a smooth top surface or perimeter suitable for vacuum sealing. As shown in FIG. 7, end effector top portion 231 comprises a manifold from which a plurality of vacuum tubing elements 229 extends to each individually actuatable row 226. Actuators 228 may comprise valving to open or close row portions 226 to vacuum.

As shown in FIG. 7, four of such individually actuatable row portions 226 are provided along with four rows 230, 232, 234 and 236 of articles. As above, hydraulic or pneumatic piston elements 239 and guide arms 238 may be employed to raise or lift one or more row portions 226 when desired. Passageways 233 within row portions 226 connect vacuum tubing 229 with outlets 235 in the row portions 226. As actuator 228 opens and closes, suction is therefore selectively provided at openings 235 via passageways 233. When articles 222 are present and in contact with row portion 226 adjacent openings 235, actuator 228 can open passageways 233 to the source of vacuum, thereby gripping the containers to row portion 226 for lifting. Once containers 222 are placed as desired, actuator 228 can close the source of vacuum thereby freeing the containers from the row portion. Generally, end effector assembly 204 operates in a substantially similar manner to end effector assembly 104, above. Namely, end effector 204 at the end of robot arm assembly 102 picks up groups of articles and can place them down sequentially on a laning conveyor row by row, one or more rows at a time.

Figure 11:
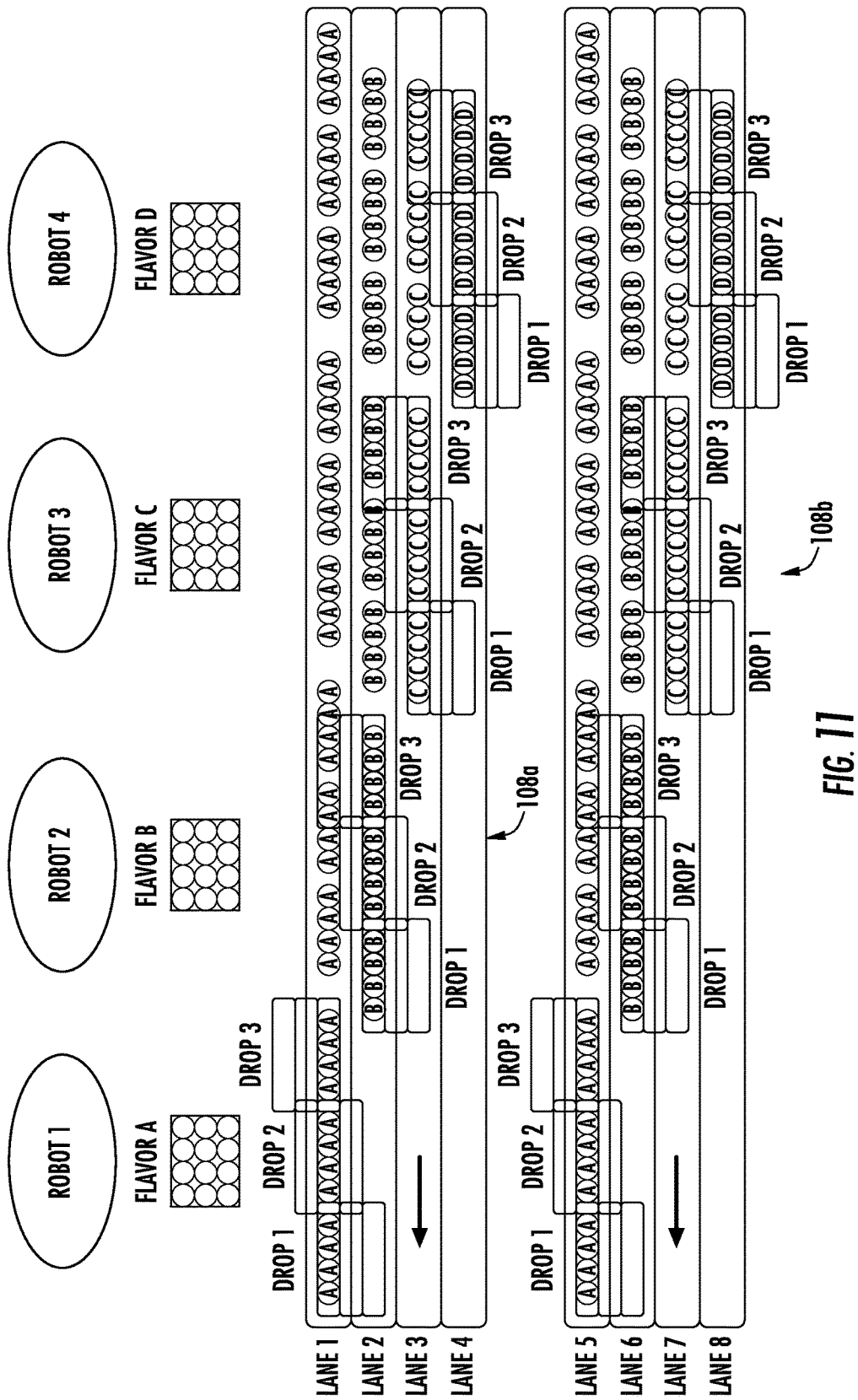
FIG. 11 is a top schematic view of a sorting installation according to certain aspects of the present disclosure showing four individual robots arm assemblies distributing four different types of articles to eight lanes of two laning conveyors.
Figure 12:
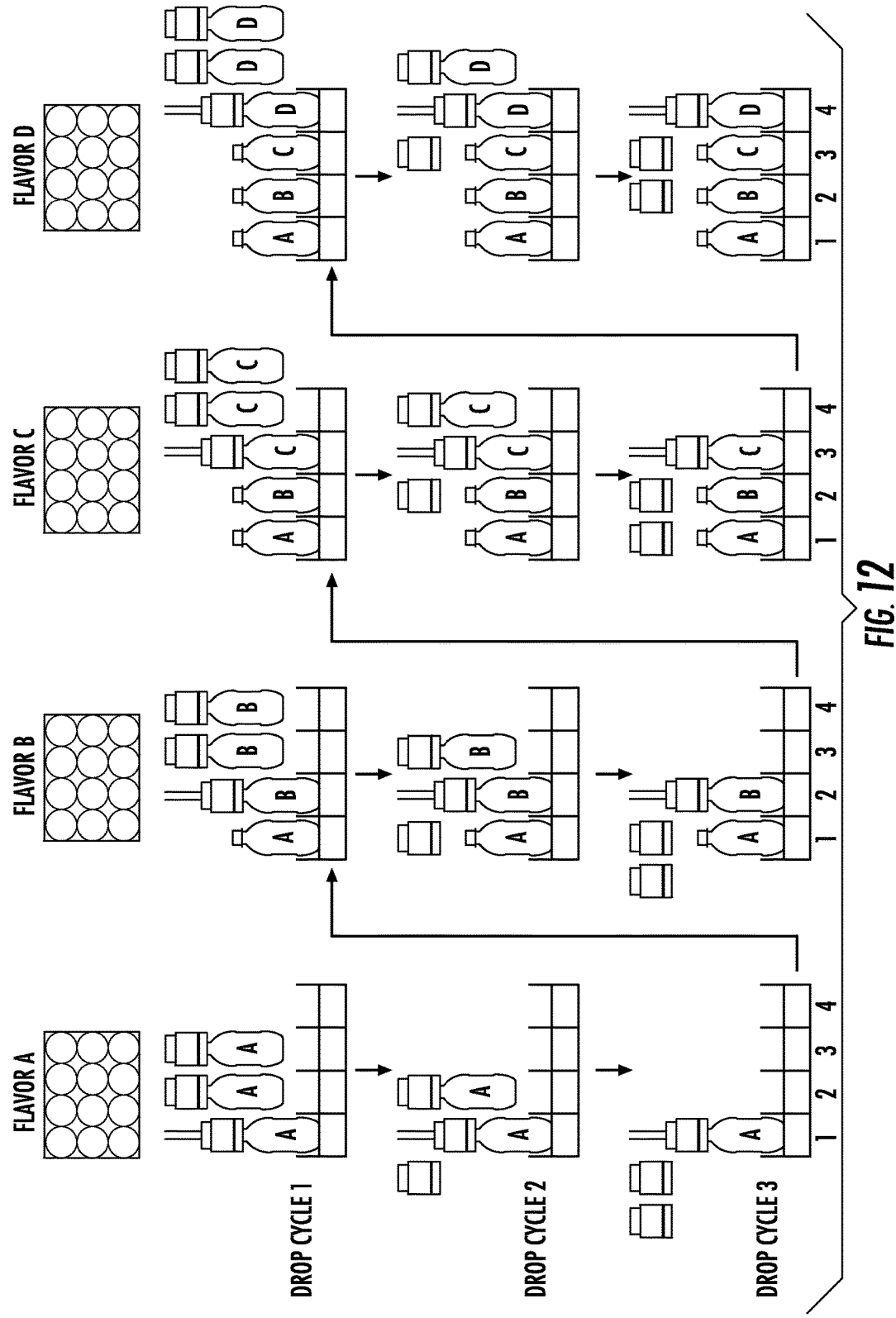
FIG. 12 is an end schematic view showing a progression of placement of articles in individual lanes by the robot or robots as shown in FIG. 11.

FIGS. 11 and 12 provide a diagrammatic view of a system incorporating a number of robot arm assemblies for placing four different flavors (A, B, C, and D) of beverage on two different laning conveyors 108a and 108b. It should be understood that flavors could be substituted with brand differentiation, product differentiation, packaging differentiation, etc. As shown herein, groups of articles are provided in 3×4 arrangement of 12 articles. Therefore, an end effector assembly for such operation only needs to include three independently actuatable row portions, but an assembly including four or more could also be employed if desired, and groups could be fed oriented either three-wide or four-wide (90 degrees apart).

As shown in FIG. 11, robot 1 can pick up flavor A articles and place them on both of laning conveyors 108a (lane 1) and laning conveyor 108b (lane 5). The lanes chosen in FIG. 11 are arbitrary and robot 1 could place articles on any of lanes 1-8 if desired. As shown, robot 1 makes three drops in each lane to place the articles. The end effector assembly of the robots as shown in FIG. 11 would overlap slightly with adjacent lanes as articles are being placed in a given lane. Accordingly, it is important that if multiple robots are being used to control them appropriately and to maintain spacing between laning conveyors 108a and 108b so as to prevent collisions. Such can be done by appropriate software and inputs. Robot 2 places flavor B in lanes 2 and 6. Robot 3 places flavor C in lanes 3 and 7. Robot 4 places flavor D in lanes 4 and 8. Again, any of robots 1-4 could place any of flavors A-D in any of lanes 1-8.

The placement of the flavors on a given laning conveyor is determined by the desired packaging downstream of the laning conveyor. For example here, a package can be made using each of lanes 1-4 including each of flavors A-D. Similarly, lanes 5-8 provide a four flavor package as well. However, if desired, lanes 1 and 2 could be flavor A, lanes 3 and 4 could be flavor B, etc. leading to a two flavor package on laning conveyor 108a. Also, if supplied in a desired order in groups 120, articles could be placed multiple adjacent lanes (e.g., 1 and 2, 2 and 3, 1-3, or 1-4, etc.) or non-adjacent lanes (1 and 3, etc.) in one instance by moving rows 126 together. Moreover, the system can be used to simply regroup one or more types of articles into differently-numbered groupings, regardless of sorting, flavors, etc. Accordingly, any suitable arrangement of articles on lanes of the laning conveyors can be achieved, limited only by the downstream packaging capabilities or desires of the facility.

FIG. 12 shows an end view of a three drop cycle via robots 1-4 for flavors A-D for a given one of the laning conveyors 108a or 108b. As shown, each grouping of articles of a given flavor is placed in three drop cycles in a given lane 1-4 of the laning conveyor. Three drop cycles are provided by the three individually actuatable row portions shown herein. It should be understood that the loading of the laning conveyor need not occur exactly as shown and that the arrangement of FIG. 12 is purely for representational purposes. For example, multiple robots may be placing multiple groups of articles at the same time. Therefore, two or more of the four groups of flavor A-D are generally placed simultaneously via robots 1-4 rather than in 12 sequential steps. Such operation provides greater throughput. However, if desired, a single robot could be used for all of the drop cycles of all four flavors, as shown in FIG. 12. Obviously, throughput would be slower in such situation. However, such an installation would require less floor space and would be less costly.

FIGS. 11 and 12 together generally show that the end effector assemblies of robot arms are moved laterally to pick up and drop articles and also with continuous motion placement parallel to a flow direction. Thus, a robot arm end effector assembly must move back and forth along the flow direction to place articles as the individual laning conveyors are moving. It is beneficial to place groups of articles adjacent to each other when possible to allow for more efficient throughput rather than to allow greater spacing between groups when placed. However, various throughput options and spacing for placement on laning conveyors are possible.

Figure 13:
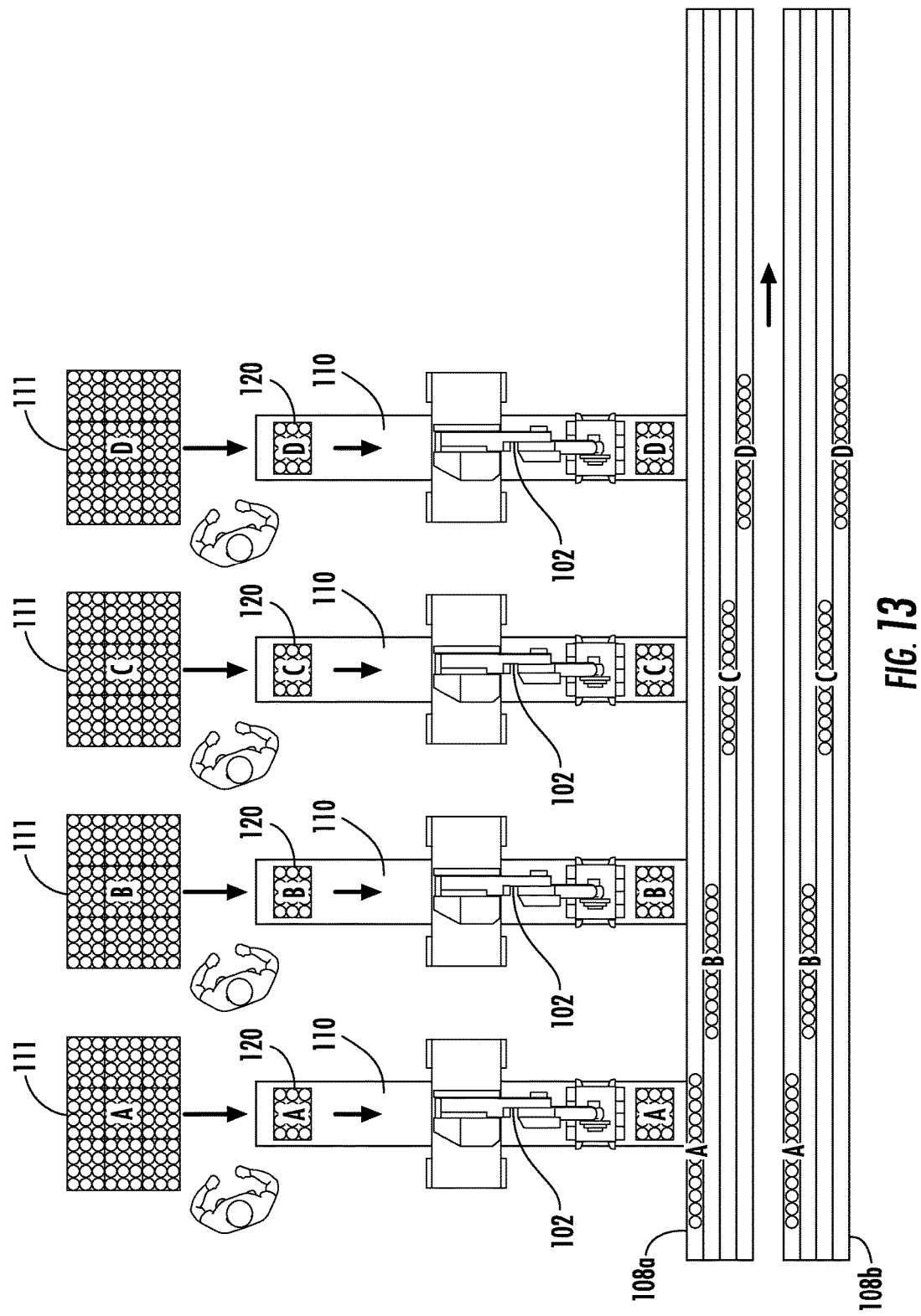
FIG. 13 is a top schematic view showing one possible layout of a laning system according to certain aspects of the invention, including four individual feeds, four robots and two laning conveyors, each including four lanes with manual loading of the feed conveyors.

FIGS. 13-18 show some of the various possible examples of systems that may incorporate teachings of the present disclosure. As shown in FIG. 13, individual supplies 111 of types or flavors A-D of articles are supplied in bulk, for example via a bulk conveyor or pallet. Individual groupings 120 are placed by hand, conveyor 110, forklift, etc. onto feed conveyors 110. Each flavor A-D is placed on a separate feed conveyor, and a separate robot arm assembly 102 is provided for each feed conveyor and flavor. Two laning conveyors 108a and 108b are provided, and robots 102 place flavors A-D on laning conveyors as indicated. Such system is similar to that shown in FIG. 11.

Figure 14:
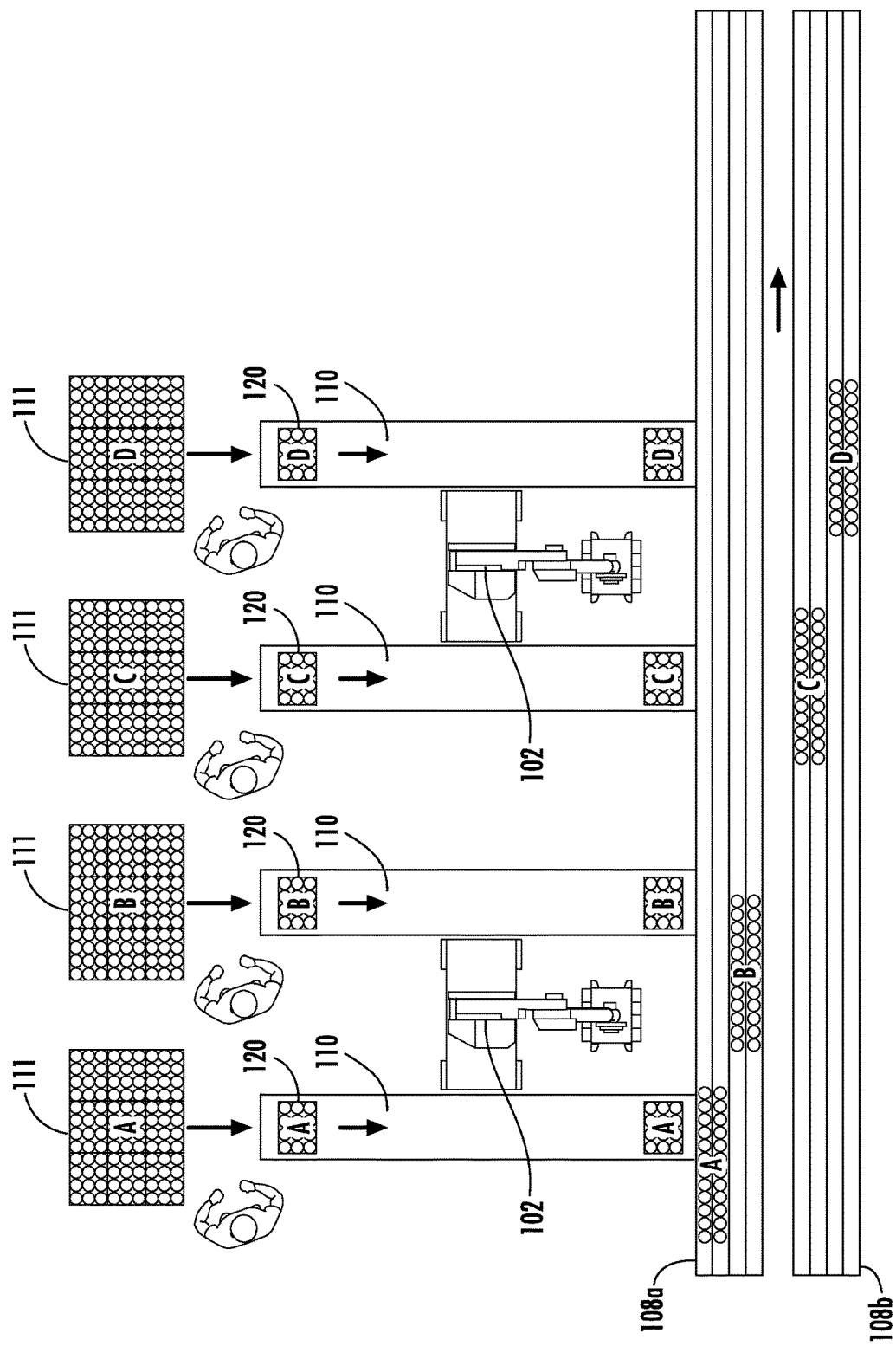
FIG. 14 is a top schematic view showing a modified version of the system of FIG. 13 wherein two robots are provided, each robot placing articles from two separate feed conveyors and wherein the distribution of articles on laning conveyors includes groups of two lanes rather than individual lanes.

FIG. 14 shows an alternate arrangement in which the four robot arm assemblies 102 have been replaced by two robot arm assemblies. Each robot arm assembly handles two of the flavors (A&B; C&D). Also, in FIG. 14, each flavor is placed on two adjacent lanes of a laning conveyor 108a and 108b. This can be done simultaneously or sequentially as desired.

Figure 15:
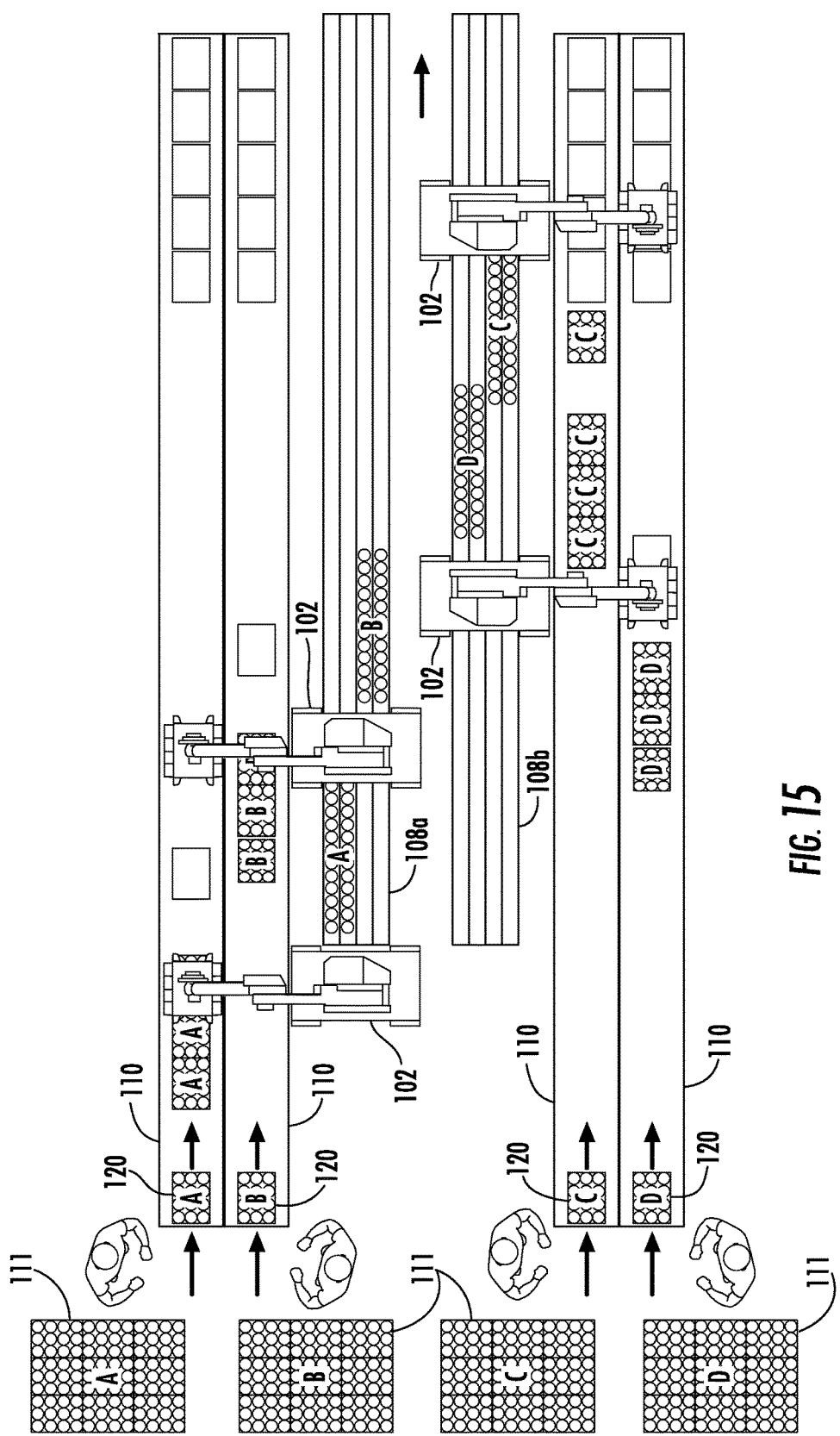
FIG. 15 is a schematic view showing an alternate arrangement wherein in-feed conveyors are parallel to the laning conveyors, are manually fed, and four robots are employed.

FIG. 15 shows an alternate arrangement in which robot arm assemblies 102 are mounted over the laning conveyors, rather than over or adjacent to the feed conveyors 110. Also, feed conveyors 110 run parallel to laning conveyors 108a and 108b.

Figure 16:
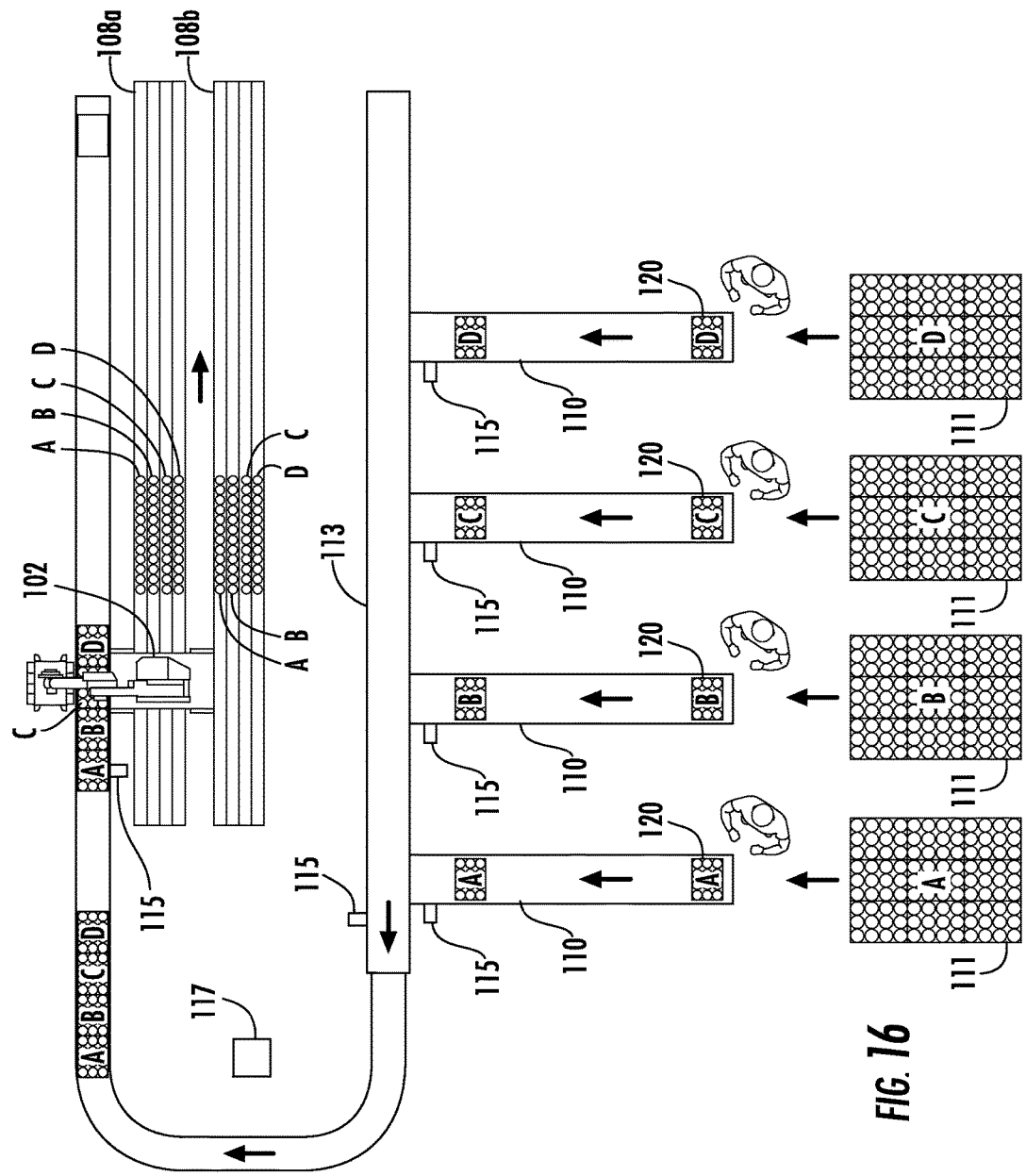
FIG. 16 is a schematic view showing an alternate arrangement wherein one feed conveyor is utilized receiving inputs from four separate supply conveyors, and one robot is utilized to place articles on two laning conveyors each including four lanes.

In FIG. 16, a single robot arm assembly 102 is employed to place four flavors A-D onto two laning conveyors 108a and 108b. Four feed supply conveyors 110 are provided, one for each flavor. A downstream feed conveyor 113 receives all flavors from upstream feed (supply) conveyors 110 and passes them to robot arm assembly 102. Sensors 115 may be provided at locations as indicated or in other locations to assist in staging or controlling the flow of article groups 120, or in identifying which flavor is in a given group so that robot arm assembly 102 may place it in a proper lane.

Sensors 115 may be used with any of the embodiments discussed herein as desired to assist in managing the flow of groups or controlling the robot arm assemblies. Sensors 115 may be infrared, optical or sonic sensors for determining a position or shape of an article. Sensors 115 may also may also incorporate readers or other optical, rfid, barcode scanners, etc. for determining product information. The programmable logic controller 117, wired or wireless, may also be employed to assist in receiving information from sensors, driving various motors on conveyors, controlling robot arm assembly 102, etc.

Figure 17:
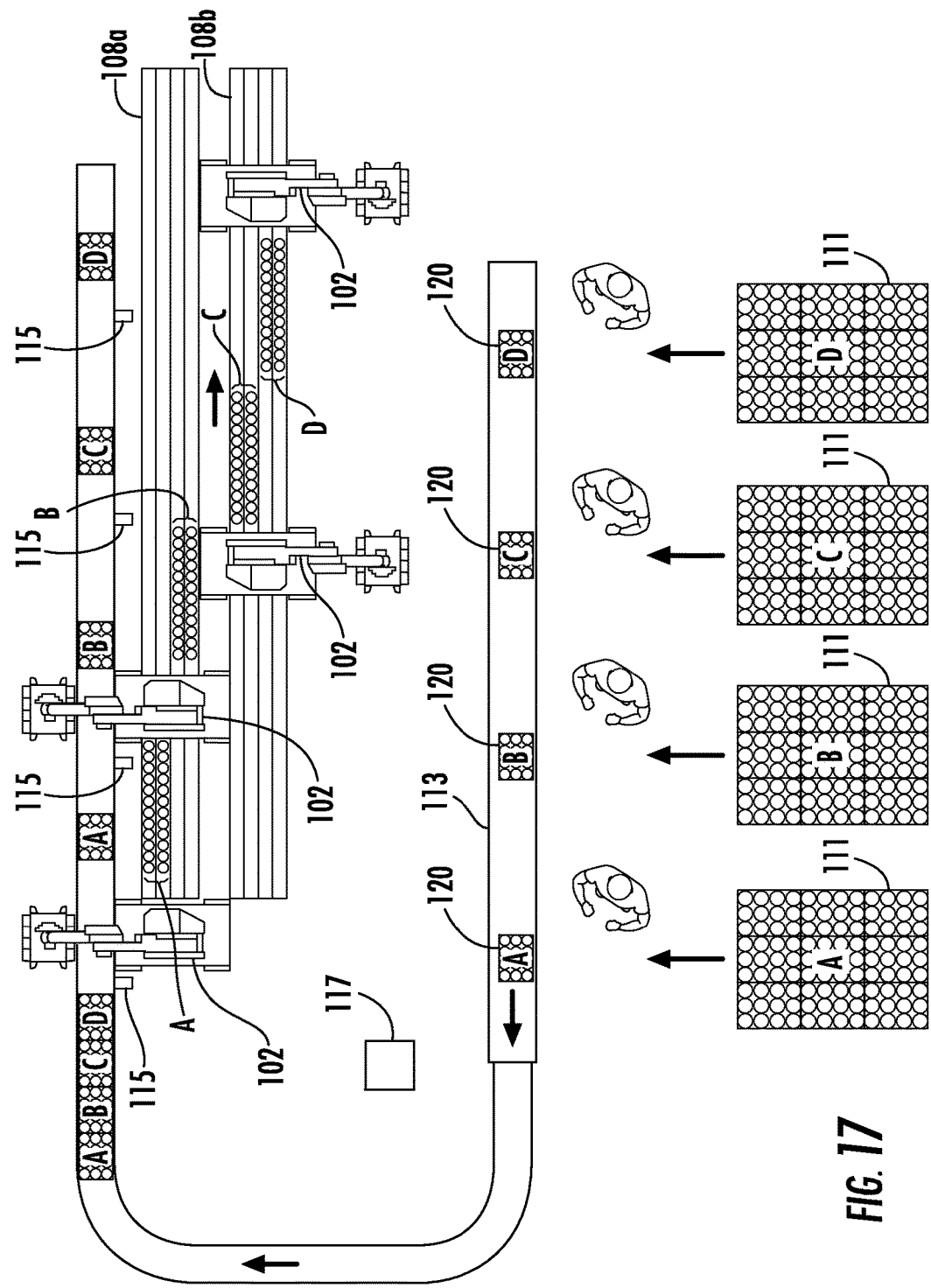
FIG. 17 is a schematic view showing a layout similar to that of FIG. 16 where a single feed conveyor is provided wherein articles are placed manually on the feed conveyor, and in which four individual robots are employed to place articles in the laning conveyor.

FIG. 17 shows a system including four robot arm assemblies 102, each mounted over one of the two laning conveyors 108a and 108b. Groups 120 of articles are placed manually on conveyor 113, without individual feed conveyors 110. Sensors 115 and controller 117 control flow through the system and operation of the robot arm assemblies, as discussed above.

Figure 18:
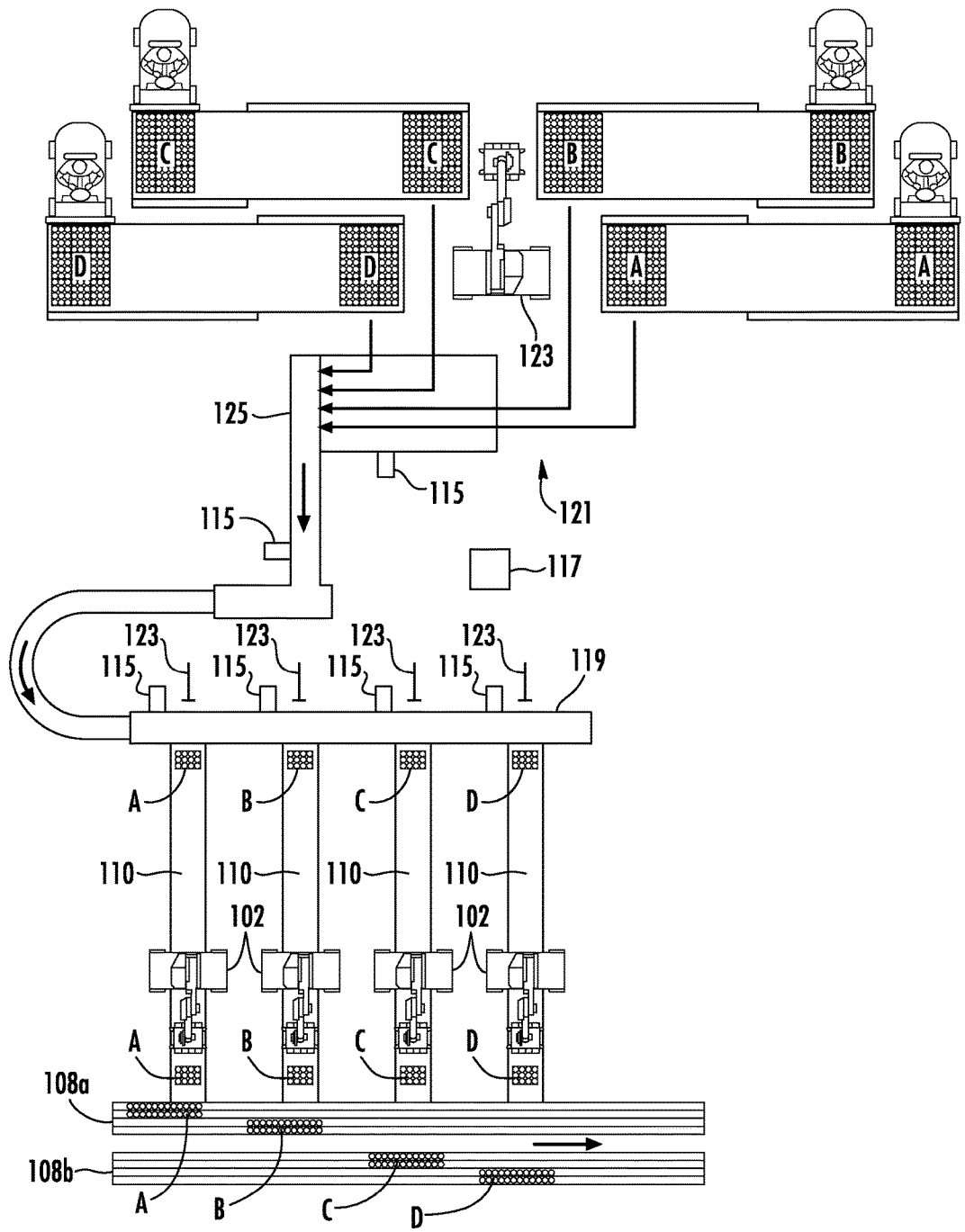
FIG. 18 is a schematic view showing an alternate arrangement in which automated de-palletizing of articles occurs upstream with feed to a single common feed conveyor, wherein individual articles are sent to divided feed conveyors, with one robot per each divided feed conveyor, placing articles onto two laning conveyors.

FIG. 18 shows a fully automated system where pallets of flavors A-D are depalletized by depalletizing robot 123 to eventually pass onto an upstream feed conveyor 125. If desired, sensors 115 may be employed throughout the system to identify flavors as they pass through the system. Pushers 123 may be employed, in conjunction with adjacent sensors 115 to move the individual flavors onto individual conveyors 110 according to the flavor. As shown, four robot arm assemblies 102 are employed, one for each flavor, for a high throughput, fully automated system.

It should be understood that characteristics of any of the systems noted above can be mixed or matched for any particular desired application. Thus use of the robot arm assemblies, end effectors, methods and systems herein are not limited to any of the particular arrangements disclosed herein. Any number of robot arm assemblies could be employed. For example, FANUC Robotics M420iA or M710iC/50H Robot Arm Assemblies could be used, along with Fanuc Robotics R30iA or R30iB Robot Controllers. Programmable Logic Controllers for the systems could be provided by Rockwell Automation/Allen-Bradley, such as CompactLogix or ControlLogix Controllers. Rockwell Automation RSView 5000 software or others could also be employed in such system, if desired.

Accordingly, using various aspects of the present disclosure, one or more flavors (or types of articles) could be mixed, matched or arranged into any number of groupings on a laning conveyor. Random arrangements could also be employed if desired. It should be understood that the present invention includes all such modifications and options.

The present invention therefore also includes a method of creating streams of articles on a laning conveyor including steps of providing groups of articles on a feed, lifting all of the articles in one of the groups from the feed simultaneously using a robot arm assembly with an end effector assembly including individually actuatable row portions, as described above. Each row portion corresponds to the location of the article in the rows of the groups, and various different types of end effectors could be employed, mechanical, vacuum, etc., as discussed above. The method further includes placing lifted articles on a given lane and the laning conveyor by sequentially moving one or more individually actuatable row portions at a time. As described above, various options and applications are possible using the above method depending mostly on the desired resulting mix of articles within a retail or wholesale grouping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A system for creating streams of articles on a laning conveyor having differentiated lanes from groups of articles on a feed, the lanes of the laning conveyor movable in a linear flow direction, the groups each including articles arranged in a grid including at least two rows, the system comprising:
   a robot arm having an end effector; and
   the end effector including individually actuatable row portions corresponding to the locations of the articles in the groups, the end effector being configured to simultaneously lift all of the articles in all of the rows of one of the groups from the feed, the end effector configured to sequentially place each row of the lifted articles one at a time onto the laning conveyor in a given lane thereof, the end effector being movable by the robot arm when the grid of articles in one of the groups in the feed is lifted, the end effector being movable linearly along the laning conveyor parallel to the flow direction when each row of lifted articles is moved downwardly and placed one at a time onto the laning conveyor.

2. The system of claim 1, wherein the individually actuatable row portions correspond to the rows of the grid.

3. The system of claim 2, wherein the row portions are configured to mechanically grip the articles.

4. The system of claim 3, wherein each row portion includes a body defining a plurality of openings for receiving articles, the openings being in registration with articles as provided in the groups, and each row portion further includes a movable mechanism within the body for contacting the articles when in the openings to grip the articles.

5. The system of claim 2, wherein the row portions are configured to grip the articles via vacuum.

6. The system of claim 5, wherein each row portion includes a body defining a vacuum path therethrough with openings in registration with articles as provided in the groups.

7. The system of claim 1, wherein the laning conveyor moves at a given speed in the linear flow direction and the robot arm end effector is moved by the robot arm along the linear flow direction as the robot arm sequentially places the lifted articles onto the laning conveyor one row portion at a time.

8. The system of claim 1, wherein the laning conveyor includes at least two lanes, and the robot arm places articles of a first type in a first of the lanes and articles of a second type in a second of the lanes.

9. The system of claim 8, wherein the articles of the first type are provided within a first group in the feed and the articles of the second type are provided within a second group within the feed.

10. The system of claim 1, wherein the feed includes a plurality of individual feed conveyors, each feed conveyor supplying groups of a separate type of article.

11. The system of claim 10 including at least two robot arms, each robot arm capable of lifting groups of articles from at least one feed conveyor.

12. The system of claim 1, wherein the system includes two of the laning conveyors.

13. The system of claim 1, wherein the end effector is configured to simultaneously place articles from at least two of the row portions on different lanes of the laning conveyor.

14. An end effector for a robot arm for lifting groups of articles on a feed and placing the articles in a given lane of multiple lanes of a laning conveyor, the lanes of the laning conveyor movable in a linear flow direction, the groups each including articles arranged in a grid including at least two rows, the end effector comprising:
   a body for attachment to the robot arm,
   individually actuatable row portions extending from the body and corresponding to the locations of the articles in the rows of the groups, and
   the row portions configured to be individually vertically movable so as to simultaneously lift all of the articles in all of the rows of one of the groups from the feed and to sequentially place each row of the lifted articles one at a time onto the laning conveyor in a given lane thereof while moving each row linearly along the laning conveyor parallel to the flow direction when each row of lifted articles is moved downwardly and placed one at a time onto the laning conveyor.

15. The end effector of claim 14, wherein the individually actuatable row portions correspond to the rows of the grid.

16. The end effector of claim 14, wherein the row portions are configured to lift at least four articles.

17. The end effector of claim 14, wherein each row portion includes a body defining a plurality of openings for receiving articles, the openings being in registration with articles as provided in the groups, and each row portion further includes a movable mechanism within the body for contacting the articles when in the openings to grip the articles.

18. The end effector of claim 17, wherein the movable mechanism includes a plate having openings for receiving the articles, the openings in the plate sized so that sliding of the plate within the body grips the articles so that the articles can be lifted by the end effector.

19. The end effector of claim 14, wherein the row portions are configured to grip the article via vacuum, and each row portion includes a body defining a vacuum path therethrough with openings in registration with articles as provided in the groups.

20. A method of creating streams of articles on a laning conveyor the laning conveyor movable in a flow direction and having differentiated lanes from groups of articles on a feed, the groups each including articles arranged in a grid including at least two rows, the method comprising the steps of:
   driving the lanes of the laning conveyor in a linear flow direction;
   providing the groups of articles on the feed;
   lifting all of the articles in one of the groups of articles from the feed simultaneously; and
   placing the lifted articles on a given lane in the laning conveyor by sequentially placing one row at a time while moving the row linearly along the laning conveyor parallel to the flow direction while each row of lifted articles is also moved downwardly.

21. The method of claim 20 wherein the lifting step is accomplished by a robot arm having an end effector including a plurality of individually actuatable row portions corresponding to the locations of the articles in the rows of the grid.

22. The method of claim 21, wherein the placing step is accomplished by an end effector disposed on the robot arm, the end effector having an individually actuatable row portion.

23. The method of claim 21, further including moving the laning conveyor at a given speed in the linear flow direction, and moving the robot arm end effector via the robot arm along the linear flow direction as the robot arm sequentially places the lifted articles one row portion at a time.

24. The method of claim 20, wherein the laning conveyor includes at least two lanes, the method further including placing articles of a first type in a first of the lanes and placing articles of a second type in a second of the lanes.

25. The method of claim 24, further including providing the articles of the first type within a first group in the feed and the articles of the second type within a second group within the feed.

26. The method of claim 20, wherein the feed includes a plurality of individual feed conveyors, the method further including each feed conveyor supplying groups of a separate type of article.

27. The method of 21, wherein lifting is done by two of the robot arms, each robot arm lifting groups of articles from at least one feed conveyor.

28. The method of claim 20, wherein providing the articles includes using includes a single feed conveyor to supply groups of different types of articles.

29. The method of claim 20, wherein placing includes placing articles on two of the laning conveyors.

30. The method of claim 20, wherein placing includes simultaneously placing articles from at least two of the row portions on different lanes of the laning conveyor.

* * * * *